(12) United States Patent
Sakamoto et al.

(10) Patent No.: US 9,381,765 B2
(45) Date of Patent: Jul. 5, 2016

(54) INTERMEDIATE TRANSFER MEDIUM AND COMBINATION OF INTERMEDIATE TRANSFER MEDIUM AND THERMAL TRANSFER SHEET

(71) Applicant: DAI NIPPON PRINTING CO., LTD., Tokyo (JP)

(72) Inventors: Kano Sakamoto, Tokyo (JP); Shinya Yoda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/431,307

(22) PCT Filed: Sep. 25, 2013

(86) PCT No.: PCT/JP2013/075896
§ 371 (c)(1),
(2) Date: Mar. 26, 2015

(87) PCT Pub. No.: WO2014/050880
PCT Pub. Date: Apr. 3, 2014

(65) Prior Publication Data
US 2015/0239273 A1    Aug. 27, 2015

(30) Foreign Application Priority Data

Sep. 26, 2012  (JP) ................... 2012-211911
Aug. 20, 2013  (JP) ................... 2013-178545
Aug. 29, 2013  (JP) ................... 2013-178546

(51) Int. Cl.
*B41M 5/382*  (2006.01)
*B41M 5/42*   (2006.01)
*B41M 5/025*  (2006.01)
*B32B 27/36*  (2006.01)
(Continued)

(52) U.S. Cl.
CPC ............ *B41M 5/025* (2013.01); *B32B 27/36* (2013.01); *B41M 5/345* (2013.01);
(Continued)

(58) Field of Classification Search
CPC .... B41M 5/382; B41M 5/38357; B41M 5/42; B41M 5/44; B41M 2205/02; B41M 2205/06; B41M 2205/10; B41M 2205/40; B32B 27/36; Y10T 428/31786
USPC ................................ 503/227; 428/32.51, 480
See application file for complete search history.

(56) References Cited

U.S. PATENT DOCUMENTS

2013/0164463 A1   6/2013  Yoda et al.

FOREIGN PATENT DOCUMENTS

JP   62-238791   10/1987
(Continued)

OTHER PUBLICATIONS

International Search Report—PCT/JP2013/075896—Dec. 17, 2013.

*Primary Examiner* — Bruce H Hess
(74) *Attorney, Agent, or Firm* — Young & Thompson

(57) ABSTRACT

Disclosed are an intermediate transfer medium excelling in peel-off property on removing a transfer layer which include a protective layer with the aid of a peel-off layer of a thermal transfer sheet, and imparting a high durability to a print which is formed by transferring the transfer layer to a transfer receiving article, and retransferring the transfer layer onto the transfer receiving article easily, and a combination of the intermediate transfer medium and a thermal transfer sheet. The intermediate transfer medium includes a substrate sheet, a protective layer and a receiving layer which are layered on a surface of the substrate sheet. The protective layer includes two or more binder resins with mutually different number average molecular weights. A sum total of products, each calculated by multiplying the number average molecular weight of individual binder resin and its content ratio in the blend together, is ≥3000 and ≤17000.

20 Claims, 5 Drawing Sheets

(51) Int. Cl.
*B41M 5/34* (2006.01)
*B41M 5/44* (2006.01)

(52) U.S. Cl.
CPC ...... *B41M 5/38214* (2013.01); *B41M 5/38257* (2013.01); *B41M 5/44* (2013.01); *B41M 2205/02* (2013.01); *B41M 2205/10* (2013.01); *B41M 2205/30* (2013.01); *B41M 2205/32* (2013.01); *B41M 2205/36* (2013.01); *B41M 2205/38* (2013.01); *B41M 2205/40* (2013.01); *Y10T 428/31786* (2015.04)

(56) References Cited

FOREIGN PATENT DOCUMENTS

| | | |
|---|---|---|
| JP | 2002-036795 | 2/2002 |
| JP | 2003-326865 | 11/2003 |
| JP | 2004-351656 | 12/2004 |
| JP | 2009-298099 | 12/2009 |
| JP | 2012-051212 | 3/2012 |
| JP | 2012-051215 | 3/2012 |
| JP | 2013-035192 | 2/2013 |
| JP | 2013-180448 | 9/2013 |

INTERMEDIATE TRANSFER MEDIUM AND COMBINATION OF INTERMEDIATE TRANSFER MEDIUM AND THERMAL TRANSFER SHEET

TECHNICAL FIELD

The present invention relates to an intermediate transfer medium, and more particularly, the present invention relates to an intermediate transfer medium which excels in peel-off property on removing a transfer layer which include a protective layer and a receiving layer with the aid of a peel-off layer of a thermal transfer sheet, and which can provide a print of high durability with ease, and a combination of such an intermediate transfer sheet and a thermal transfer sheet.

BACKGROUND ART

Conventionally, thermal transfer method has been widely used as a simple printing method. The thermal transfer method is an image forming method wherein a thermal transfer sheet which is provided with a colorant layer formed on a surface of a substrate sheet thereof is superposed on a thermal transfer image-receiving sheet which is provided with a receiving layer, then the back side of the thermal transfer sheet is heated by a heating means such as a thermal head with a shape of an intended image, and thereby the colorant included in the colorant layer is selectively transferred to the thermal transfer image-receiving sheet to form the image on the receiving layer of the thermal transfer image-receiving sheet.

The thermal transfer method may be divided into two methods, i.e., melt-transfer method and sublimation transfer method. The melt-transfer method is an image forming method wherein a thermal transfer sheet, in which a thermally fusible ink layer comprising a colorant, such as a pigment, and a binder for dissolving or dispersing the colorant, such as a thermally fusible wax or resin, is carried on a substrate sheet, is used; then, an energy in accordance with image information is applied to the thermal transfer sheet by a heating means such as a thermal head; and thereby the colorant is transferred onto the thermal transfer image-receiving sheet, such as a plastic sheet or paper, together with the binder. The image formed by the melt-transfer method is suitable for recording binary images such as characters, since the image has excellent sharpness and high concentration.

On the other hand, the sublimation transfer method is another image forming method wherein a thermal transfer sheet, in which a dye layer comprising a dye which is able to be transferred thermally by sublimation, and a resin binder for dissolving or dispersing the dye, is carried on a substrate sheet, is used; then, an energy in accordance with image information is applied to the thermal transfer sheet by a heating means such as a thermal head; and thereby only the dye is transferred onto a substrate sheet, such as a plastic sheet or paper, or onto a thermal transfer image-receiving sheet which is optionally provided with a receiving layer. With respect to the sublimation transfer method, since the transferring amount of dye can be controlled by the amount of energy applied, it is possible to form a gray-scale image in which image density is controlled. In addition, since the colorants used are dyes, the image formed has transparency. Thus, when dyes of different colors are superposed, the reproducibility of neutral tints becomes excellent. Therefore, when using thermal transfer sheets of different colors such as yellow, magenta, cyan, black or the like, and transferring dye of each color on the thermal transfer image-receiving sheet so as to superpose the dyes each other, it is possible to form a photographic full-color image of high quality in which reproducibility of neutral tints is excellent.

Along by the development of various hardware and software related to multimedia, this thermal transferring method have been expanding its market as a full-color hard copy system for digital images represented by computer graphics, satellite static images, CD-ROM or the like, and for analog images such as video. The thermal transfer image-receiving sheet according to the thermal transfer method includes a wide range of concrete applications. As typical examples, proof printing; image output; output of plan or design, such as those drawn by CAD/CAM, etc.; output use for various medical analytical or measuring instruments such as CT scan, endoscopic camera, etc.; and a substitute for instant photos; as well as, output of picture of face to an identification paper or ID card, credit card, or other cards; and applications as composite photograph or souvenir picture at an amusement facilities such as amusement park, amusement arcade, museum, and aquarium, etc., can be mentioned.

With the diversification of use of the above-mentioned thermal transfer image-receiving sheet, there is an increasing demand for forming a thermal transfer image on an arbitrary object. As the object for forming the thermal transfer image, a purpose-built thermal transfer image-receiving sheet which is provided with a receiving layer on the substrate is usually utilized. However, in this case, the substrate or the like subjects to some type of constraints. Under these circumstances, Patent literature 1 discloses an intermediate transfer medium in which the receiving layer is provided on the substrate so that the receiving layer can be peeled off from the substrate. According to the intermediate transfer medium, by transferring the dye of the dye layer to the receiving layer so as to form an image, and then heating the intermediate transfer medium, it is possible to transfer the receiving layer onto which the dye has been transferred to an arbitrary transfer receiving article. Thus, it becomes possible to form a thermal transfer image without concern for the constraints about the kind of transfer receiving article.

Since the intermediate transfer medium described above can transfer the receiving layer to an arbitrary transfer receiving article, it is preferably used for the article which is less likely to allow colorant transference, migrate and thus is impossible to form a high-quality image directly thereon, and for the article which is likely to cause fused adherence with a colorant layer when undergoing the thermal transfer. Incidentally, depending on the type of the print where the receiving layer is transferred on the transfer receiving article, it may be necessary to leave a certain region untreated, for instance, regions allocated for an IC chip, a magnetic strip, a transmitting and receiving antenna unit, a signature portion and the like. Thus, on the surface of the transfer receiving article, in some cases, there is a region that is inconvenient when covered with the receiving layer.

Under these circumstances, some attempts have been made, wherein, in advance of transferring the receiving layer to the transfer receiving article, the region that is inconvenient when covered with the receiving layer or the region that is other than the region which should be transferred to an arbitrary transfer receiving article is removed off with the aid of a peel-off layer which has been provided on the substrate of the thermal transfer sheet. For instance, Patent literature 2 discloses a method for image formation which comprises using a thermal transfer sheet comprising a substrate and a peel-off layer provided on the substrate in advance, and putting the thermal transfer sheet and an intermediate transfer medium on top of each other so that the peel-off layer in the thermal transfer sheet is brought into contact with the transfer part in the intermediate transfer medium and heating the assembly to remove the transfer part in its predetermined region from the intermediate transfer recording medium in order to prevent the transfer of the predetermined region to the transfer receiving article, and the thermal transfer sheet used and the print thus formed.

By the way, the thermal transfer image which is formed by using the intermediate transfer medium mentioned above, in other words, the print which is obtained by transferring the receiving layer, on which an image has been formed, to the transfer receiving article, suffers with a problem of lack of durability including weather resistance, abrasion resistance, chemical resistance, etc., since the receiving layer onto which an image is formed is positioned on the outermost surface. Then, recently, as shown in Patent literature 3, an intermediate transfer medium in which a protective layer and a layer functioned both as receiving layer and adhesive layer are provided in that order on a substrate has been proposed. According to this intermediate transfer medium, since the thermal transfer image is formed on the layer functioned both as receiving layer and adhesive layer, and then the layer functioned both as receiving layer and adhesive layer on which the thermal transfer image has been formed, and the protective layer are transferred onto the transfer receiving article, and thus the protective layer comes to be formed on the surface of the thermal transfer image, it is possible to improve the durability of the print which is formed by transferring the receiving layer.

PRIOR ART LITERATURE

Patent Literature

Patent Document 1: JP SH062-238791 A
Patent Document 2: JP 2003-326865 A
Patent Document 3: JP 2004-351656 A

SUMMARY OF THE INVENTION

Problems to be Solved by the Invention

However, the durability of the protective layer of the intermediate transfer medium, which is proposed in Patent literature 3, have not reached the stage to satisfy demands in the fields where a particularly high durability is required, such as the field of identification paper, ID card, credit card, etc. Therefore, there is a room for improvement for the durability.

In addition, in the case that the peel-off property on removing a predetermined region of the transfer layer which includes the receiving layer and the protective layer (hereinafter, it is referred to simply as "transfer layer", occasionally.) by mean of the peel-off layer of the thermal transfer sheet is low, it is not possible to remove the transfer layer in the shape as the aim, and problems such that the transfer layer is removed even at the region where the transfer layer should be remained inherently, and that a part of the transfer layer is remained on the intermediate transfer medium at the region where the transfer layer should be removed, may be caused. Therefore, the transfer layer of the intermediate transfer medium is required to have a good peel-off properties, in addition to having a capability of imparting a high durability to the print which is obtained by transferring the transfer layer onto a transfer receiving article. However, the improvement in the durability of the print which is obtained by transferring the transfer layer onto the transfer receiving article and the improvement in the peel-off property of the transfer layer are in a trade-off relationship. Thus, when attempting to improve the durability of the protective layer which constitutes the transfer layer in order to the durability of the print which is obtained by transferring the transfer layer onto the transfer receiving article, the peel-off property of the transfer layer becomes lower unavoidably. Further, for the transfer layer, a good transferability at the time of re-transferred onto the transfer receiving article is required, in addition to the above-mentioned good peel-off property. However, even if the transferability of the transfer layer is simply improved, it is not possible to satisfy the peel-off property of the transfer layer.

Further, in the combination of a thermal transfer sheet having a peel-off layer, and an intermediate transfer medium which include a transfer layer where a protective layer and a receiving layer are layered, the peel-off property of the transfer layer may not be able to be satisfied, depending on the kinds of the components of the peel-off layer and the combinations with the component of the protective layer. Therefore, in order to satisfy the peel-off property of the transfer layer, it is necessary to consider not only about the components which constitute the transfer layer, but also about the components which constitute the peel-off layer. Currently, any attempt to improve the peel-off property of the transfer layer by paying attention to the components of the peel-off layer as well as the components of the protective layer have not been proposed at all.

The present invention has been made in view of the above-mentioned circumstances, and the present invention aims principally to provide an intermediate transfer medium which excels in peel-off property on removing a transfer layer which include a protective layer with the aid of a peel-off layer of a thermal transfer sheet, regardless of the characteristics of the peel-off layer of the thermal transfer sheet, and which can impart a high durability to a print which is formed by transferring a transfer layer to a transfer receiving article, and which can retransfer the transfer layer onto the transfer receiving article without any problem, and a combination of the intermediate transfer medium and a thermal transfer sheet, which excels in the peel-off property on removing the transfer layer which include the protective layer with the aid of the peel-off layer of the thermal transfer sheet, regardless of the characteristics of the peel-off layer of the thermal transfer sheet, and which can impart a high durability to a print which is formed by transferring the transfer layer to a transfer receiving article, and which can retransfer the transfer layer onto the transfer receiving article without any problem.

Means for Solving the Problems

The present invention for solving the above-mentioned problems is an intermediate transfer medium which comprises a substrate sheet, a protective layer and a receiving layer which are layered on a surface of the substrate sheet; wherein the protective layer comprises a blend of two or more kinds of binder resins which have mutually different number average molecular weights (Mn), and wherein a sum total ($\Sigma$) of products, each product being calculated by multiplying the number average molecular weight (Mn) of individual binder resin and its content ratio in the blend together, is in the range of not less than 3000 and not more than 17000.

In the present invention, at least one binder resin of two or more kinds of the binder resins mentioned above may be a polyester type resin.

Further, in the present invention, two or more kinds of the binder resins mentioned above may include a polyester type resin A having a number average molecular weight (Mn) of not less than 2000 and not more than 10000, and a polyester type resin B having a number average molecular weight (Mn) of more than 10000 and not more than 25000.

Furthermore, in the present invention, two or more kinds of the binder resins mentioned above may include a polyester type resin A1 having a number average molecular weight (Mn) of not less than 2000 and not more than 4000, a polyester type resin A2 having a number average molecular weight (Mn) of more than 4000 and not more than 10000, and a polyester type resin B having a number average molecular weight (Mn) of more than 10000 and not more than 25000.

In addition, in the present invention, a release layer may be provided between the protective layer and the substrate sheet.

The present invention for solving the above problems is a combination of an intermediate transfer medium and a thermal transfer sheet, wherein the intermediate transfer medium comprises a substrate, a protective layer and a receiving layer which are layered in this order on a surface of the substrate sheet, wherein the protective layer comprises a polyester type resin having a number average molecular weight (Mn) of not less than 5000 and not more than 15000, and wherein the thermal transfer sheet comprises another substrate, and a peel-off layer which is provided on a surface of the another substrate, wherein the peel-off layer includes one or more kinds of resins selected from the group consisting of acrylic resins, vinyl chloride-vinyl acetate copolymer resins and polyester resins.

Effect of the Invention

According to the intermediate transfer medium of the present invention, and according to the combination of the intermediate transfer medium and the thermal transfer sheet of the present invention, it is possible to obtain a good peel-off property when removing a desired region of the transfer layer by means of the peel-off layer of the thermal transfer sheet, and it is also possible to re-transfer the transfer layer onto a transfer receiving article without any problem. In addition, it becomes possible to impart a high durability to the transfer receiving article onto which the transfer sheet has been retransferred.

EMBODIMENTS OF THE INVENTION

Intermediate Transfer Medium

Figure 1:
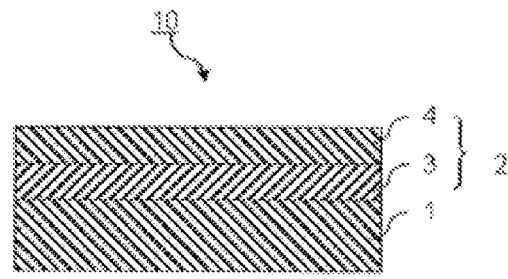
FIG. 1 is a schematic sectional view showing an embodiment of the intermediate transfer medium of the present invention.

Now, embodiments of the intermediate transfer medium according to the present invention will be described in detail. FIG. 1 is a schematic sectional view showing an embodiment of the intermediate transfer medium according to the present invention. As shown in FIG. 1, the intermediate transfer medium 10 according to the present invention comprises a substrate sheet 1, and a transfer layer 2 which is formed on one surface side of the substrate sheet 1. The transfer layer has a layered structure of a protective layer 3 and a receiving layer 5 which are layered in this order from the side of the substrate sheet 1. The protective layer 4 and the receiving layer 5 are the layers which are transferred to a transfer receiving article at the time of thermal transfer, and they compose the transfer layer 2.

Figure 2:
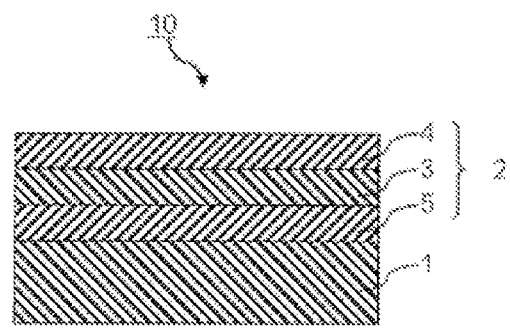
FIG. 2 is a schematic sectional view showing another embodiment of the intermediate transfer medium of the present invention.

In FIG. 2, another embodiment of the intermediate transfer medium according to the present invention is shown. The intermediate transfer medium 10 of the embodiment shown in FIG. 2 has a layered structure in which an exfoliate layer 5, a protective layer 3 and a receiving layer 5 are formed on one surface side of the substrate 1. The exfoliate layer 5 is an optional layer which is transferred together with the protective layer 3 and the receiving layer 4 to a transfer receiving article at the time of thermal transfer, and it constitutes a part of the transfer layer 2.

Hereinafter, the layers constituting the intermediate transfer medium of the present invention will be described in detail.

(Substrate Sheet)

As the substrate sheet 1 in the intermediate transfer medium, since a heat is applied at the time of the thermal transfer, it is preferable to have a mechanical strength to the extent of being able to handle without a hitch even in a heated state, in addition to a function of sustaining the transfer layer 2. There is no particular limitation to the material for such a substrate sheet 1, and as the substrate sheet, unstretched or stretched plastic films, for instance, polyesters having high heat resistance such as polyethylene terephthalate and polyethylene naphthalate; polypropylene; polycarbonate; cellulose acetate; polyethylene derivatives; polyamides, and polymethylpentene, etc., can be exemplified. Composite films obtained by laminating two or more of these materials can be also used. The thickness of the substrate sheet 1 may be appropriately selected depending on the kind of the material used, so that the strength, heat resistance and the like of the substrate sheet lie in appropriate ranges. Usually, about 1 μm-100 μm in thickness is preferably used. The same things apply to a substrate 51 of the intermediate transfer medium used in the combination of the intermediate transfer medium and the thermal transfer sheet described later.

(Transfer Layer)

As shown in FIG. 1, on the substrate sheet 1, the transfer layer 2 is formed so that it is able to be separated from the substrate sheet 1 at the time of heat transfer. This transfer layer 2 comprises at least the protective layer 3 and the receiving layer 4, both of which are essential constituents of the intermediate transfer medium 10 of the present invention. The transfer layer 2 is exfoliated from the substrate sheet 1 and is transferred to a transfer receiving article during the thermal transfer.

(Protective Layer)

The protective layer 1 which is an essential constituent of the intermediate transfer medium 10 according to the present invention is provided between the substrate sheet 1 and the receiving layer as shown in FIG. 1 (in FIG. 2, between the exfoliate layer 5 and the receiving layer 4). In the present invention, in order to improve the peel-off property of the transfer layer 2 which includes the protective layer 3, and in order to improve the durability of the print which is obtained by transferring the transfer layer 2 onto a transfer receiving article, the protective layer 3 which constitutes the transfer layer includes a blend of two or more kinds of binder resins which have mutually different number average molecular weights (Mn), and a sum total ($\Sigma$) of products, each product being calculated by multiplying the number average molecular weight (Mn) of individual binder resin and its content ratio in the blend together, is in the range of not less than 3000 and not more than 17000. According to the protective layer 3 having these features, a good peel-off property of the transfer layer 2 including the protective layer 3 can be attained, and it is possible to remove the transfer layer 2 in a predetermined region as the aimed shape with the aid of a peel-off layer of a thermal transfer sheet, regardless of the characteristics of the peel-off layer of the thermal transfer sheet. Further, according to the protective layer 3 having the above features, it is possible to improve the durability of the protective layer 3, and possible to improve the durability of a print which is formed by transferring a transfer layer 2 which includes the protective layer 3 to a transfer receiving article. Incidentally, the peel-off layer of the thermal transfer sheet will be described later. The number average molecular weight (Mn) used herein denotes a number average molecular weight measured by Gel Permeation Chromatography (GPC) in terms of polystyrene standard. The glass transition temperature (Tg) used herein denotes a temperature calculated from measurement of a change of calorie (DSC method) in accordance with the DSC (differential scanning calorimetry).

The detailed mechanism of improvements in the peel-off property and the durability of the protective layer 2 by including a blend of two or more kinds of binder resins, and setting the sum total ($\Sigma$) of products, each product being calculated by multiplying the number average molecular weight (Mn) of individual binder resin and its content ratio in the blend together, to be in the range of not less than 3000 and not more than 17000, has not been clarified yet. However, in the present invention, since the binder resin(s) the number average molecular weight (Mn) of which is higher than the sum total (s), and the binder resin(s) the number average molecular weight (Mn) of which is lower than the sum total ($\Sigma$) are included in the protective layer, the peel-off property and the durability, assumedly, can balance each other out, by the synergistic effect of two or more kinds of such binder resins, and thereby both of the peel-off property and durability would attain to their satisfactory levels. Even if the improvements do not depend on this assumptive mechanism, it can be revealed from the results of Examples and Comparative Examples described later that the transfer layer 2 which includes the protective layer 3 of the above features is superior in both peel-off property and the durability as compared with the transfer layer which includes a protective layer which does not satisfy the above features. In summary, according to the intermediate transfer medium 10 of the present invention, by adopting, as the protective layer which constitutes the transfer layer, the protective layer 3 as described above, it becomes possible to satisfy the durability of the print obtained by transferring the transfer layer 2 which includes the protective layer onto the transfer material, while the peel-off property of the transfer layer 2 can be in a favorable level.

Figure 11:
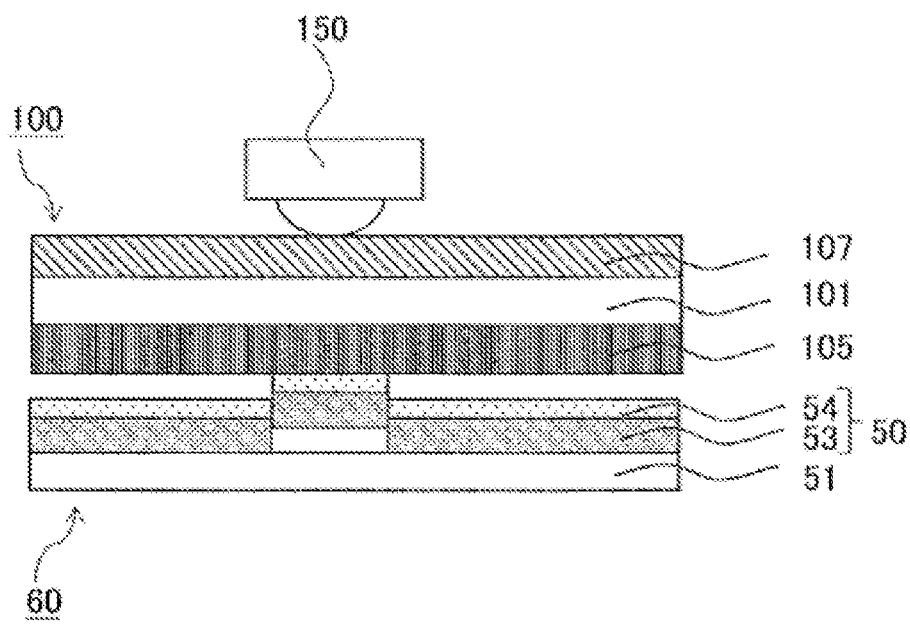
FIG. 11 is a schematic sectional view showing a state in which the intermediate transfer medium and the thermal transfer sheet are combined in the combination of the present invention.

The word "peel-off" used herein means that, when transfer layer 2 of the intermediate transfer medium 10 used in the present invention (in the case of the combination of the intermediate transfer medium and the thermal transfer sheet according to the present invention shown in FIG. 11, an transfer layer 50 of the intermediate transfer medium 60) is superposed on the peel-off layer 11 of the thermal transfer sheet 20 (in the case of the combination of the intermediate transfer medium and the thermal transfer sheet according to the present invention shown in FIG. 11, a peel-off layer 105 of the intermediate transfer medium 60) and heat is applied to the back face side of the thermal transfer sheet, the transfer layer 2 (50) that is located at a region corresponding to the heat applied region (hereinafter, it is referred to as "transfer region".) is removed by the peel-off layer 11 (105). The "peel-off property" used herein is an index indicating whether only the transfer layer 2 (50) which is corresponding to the transfer region 9 can be removed accurately from the intermediate transfer medium. On the other hand, the "transferring property" is an index indicating whether the transfer layer corresponding to the transfer region 9 can be transferred accurately onto the transfer receiving article when heating the back face side of the intermediate transfer medium. That is, the "peel-off property" indicates the characteristics at when the transfer layer is removed, whereas the "transferability" indicates the characteristics at when the transfer layer is transferred onto the transfer receiving article. Therefore, they are different from each other. Although the present invention aims to improve the "peel-off property" of the transfer layer 2 (50) as one purpose, it does not intend to sacrifice the above mentioned "transferring property" of the transfer layer 2 (50) to enhance the "peel-off property". That is, according to the intermediate transfer medium 10 having the protective layer 3 which fulfils the above mentioned features of the present invention, and the combination of the intermediate transfer medium 60 and the thermal transfer sheet 100 of the present invention as mentioned below, it becomes possible to give a good peel-off property to the transfer layer 2 (50) which includes the protective layer 3 (53), while it is possible to re-transfer the transfer layer 2 (50) after peeled off onto a transfer receiving article without any problem. Incidentally, since the "transferring property" and the "peel-off property" are different from each other, it is impossible to satisfy the "peel-off property", when simply employing the conventional protective layer which has been known in the art as being excellent in transferring property.

If the peel-off property of the transfer layer is low, in the transfer layer corresponding to the transfer region 9, the transfer layer which is located near the boundary of the transfer region 9 and the non-heating region (hereinafter, it is referred to as "non-transfer region".) cannot be accurately removed, and thus, it may cause a problem that a part of the transfer layer which should be intrinsically removed remains on the intermediate transfer medium. Alternatively, it may cause a problem that a part of the transfer layer which should intrinsically remain on the intermediate transfer medium, that is, the transfer layer corresponding to a part of non-transfer region is removed along with the transfer layer corresponding to the transfer region 9, so that the transfer layer corresponding to the transfer region 9 trails the transfer layer corresponding to a part of the non-transfer region starting from the boundary of the transfer region 9 and the non-transfer region. This point similarly applies to the combination of the intermediate transfer medium and the thermal transfer sheet combination of the present invention described below.

When the above-mentioned sum total ($\Sigma$) is less than 3000, although the peel-off property becomes excellent, it cannot be made to sufficiently satisfy durability such as mechanical strength. On the other hand, when the sum total ($\Sigma$) is more than 17000, although the durability becomes a satisfactory level, the peel-off property of the transfer layer 2 becomes lower, and thus, when removing the desired portion of the transfer layer 2, it is impossible to remove the transfer layer 2 as the intended shape.

When the sum total ($\Sigma$) satisfies the above conditions, it is possible to satisfy both of the peel-off property and the durability. In a usage where a higher durability and a superior peel-off property is required, it is preferable that the protective layer 3 contains a binder resin the number average molecular weight (Mn) of which is not less than 3000 and not more than 30000. Further, in a usage where a still higher durability and a still superior peel-off property is required, it is preferable that the protective layer 3 contains a binder resin the number average molecular weight (Mn) of which is not less than 12000.

The content of the binder resin which constitutes the protective layer 3 is not particularly limited. However, when the content of the blend of two or more kinds of binder resins wherein the sum total ($\Sigma$) is in the range of not less than 3000 and not more than 17000 is less than 20% by mass on the basis of the total solid content of the protective layer 3, the peel-off property of the transfer layer 2 tends to become lower and the durability of the print which is obtained by transferring the transfer layer 2 onto the transfer receiving article tends to decrease. Therefore, considering this point, it is preferable that the blend of two or more kinds of binder resins wherein the sum total ($\Sigma$) is in the range of not less than 3000 and not more than 17000 is contained in a ratio of not less than 20% by mass on the basis of the total solid content of the protective layer 3, and more desirably, in a ratio of not less than 30% by mass on the basis of the total solid content of the protective layer 3. The upper limit of the content of the blend of two or more kinds of binder resins wherein the sum total ($\Sigma$) is in the range of not less than 3000 and not more than 17000 is not particularly limited, and it may be 100% by mass.

There is no particular limitation for the binder resin components constituting the protective layer 3 of the present invention, and it is possible to use any resin components by appropriate selection from blends, each of which includes two or more kinds of binder resins which have mutually different number average molecular weights (Mn), and wherein the sum total ($\Sigma$) of products, each product being calculated by multiplying the number average molecular weight (Mn) of individual binder resin, "i", and its content ratio, "r", in the blend together, is in the range of not less than 3000 and not more than 17000. For example, polyester resins, polyester urethane resins, polycarbonate resins, acrylic resins, ultraviolet absorbing resins, epoxy resins, acrylic urethane resins, butyral resins, polyamide resins, vinyl chloride resin, phenoxy resin, bisphenol resin, and silicone-modified forms of these resins, and any blends of these resins, ionizing radiation curable resins, and ultraviolet absorbing resins, each of which satisfies the above-mentioned conditions, may be enumerated. Among them, in the present invention, it is preferable that at least one binder resin of the two or more kinds of the binder resins is a polyester type resin, such as a polyester resin and a polyester urethane resin. Herein, the polyester resin and the polyester urethane resin may be a copolymer which is copolymerized with other thermoplastic resin(s).

Next, a preferred embodiment of the protective layer will be explained. The protective layer 3 in the preferred embodiment includes a polyester type resin A having a number average molecular weight (Mn) of not less than 2000 and not more than 10000, and a polyester type resin B having a number average molecular weight (Mn) of more than 10000 and not more than 25000. According to the protective layer 3 wherein the sum total ($\Sigma$) satisfies the above conditions, and which includes the above-mentioned polyester type resin A and the above-mentioned polyester type resin B, it is possible to make the peel-off property of the transfer layer 2 which includes the protective layer 3 a particularly excellent one, and it is also possible to impart a very good durability to the print which is obtained by transferring the transfer layer 2 which includes the protective layer 3 on the transfer receiving article. Specifically, the polyester resin A which is contained in the protective layer 3 is a binder resin for the purpose of further improving the peel-off property of the transfer layer 2, and, the polyester resin B which is contained in the protective layer 3 is a binder resin for the purpose of further improving the durability of the print which is obtained by transferring the transfer layer on the transfer receiving article. For further improvements in the durability and the peel-off property, it is preferable to use, as the polyester type resin, the one which has a glass transition temperature (Tg) of 35° C.-60° C. This is the same for the preferred glass transition temperature (Tg) of the polyester type resin A1, and the preferred glass transition temperature (Tg) of the polyester type resin A2.

Incidentally, the durability of the protective layer which includes only a polyester resin having a number average molecular weight (Mn) of less than 2000 and the polyester type resin B is lower than the durability of the protective layer which includes only the polyester type resin A and the polyester type resin B. Therefore, the durability of the print which is obtained by transferring the transfer layer which includes the former protective layer on the transfer receiving article is lower than the durability of the print which is obtained by transferring the transfer layer which includes the latter protective layer on the transfer receiving article. Namely, in the case that the protective layer is prepared by including the polyester resin having a number average molecular weight (Mn) of less than 2000 and the polyester type resin B, although it is possible to improve amply the peel-off property of the transfer layer which includes the protective layer, but the durability of the protective layer becomes lower due to the inclusion of the polyester resin having a number average molecular weight (Mn) of less than 2000. And, in such cases, it may become difficult to make good sufficiently the reduction in the durability by the polyester type resin B.

In the case that the protective layer which constitutes the transfer layer 2 includes a polyester resin having a number average molecular weight (Mn) of more than 25000 and the polyester type resin A, the peel-off property of the transfer layer tends to become lower, as compared with the case that the protective layer which constitutes the transfer layer 2 includes the polyester type resin A and the polyester type resin B. Namely, in the case that the protective layer is prepared by including the polyester type resin A and the polyester resin having a number average molecular weight (Mn) of more than 25000, although it is possible to improve the durability of the protective layer and to improve sufficiently the durability of the print which is obtained by transferring the transfer layer which includes the protective layer on the transfer receiving article, but the peel-off property of the transfer layer becomes lower due to the inclusion of the polyester resin having a number average molecular weight (Mn) of more than 25000. And, in such cases, it may become difficult to make good sufficiently the reduction in the peel-off property by the polyester type resin A.

The polyester type resin A and the polyester type resin B which are contained in the protective layer 3 in the embodiment of the present invention are an optimal combination of binder resins because they can make the peel-off property of the transfer layer 2 which includes the protective layer 3 very good, and can impart a very good durability to the print which is obtained by transferring the transfer layer on the transfer receiving article. Thus, it can be said to be a preferred embodiment of the protective layer 3. Although the protective layer 3 of the preferred embodiment may contain any other binder resin(s) in addition to the polyester type resin A and the polyester type resin B, but it is preferable that the total mass of the polyester type resin A and the polyester type resin B is not less than 20% by mass on the basis of the total solid content of the protective layer 3, and more desirably, not less than 30% by mass on the basis of the total solid content of the protective layer 3.

Further, in the case that the polyester type resin A and the polyester type resin B are contained in the protective layer 3, it is preferable that the content of the polyester type resin A is not less than 10% by mass and not more than 70% by mass on the basis of the total mass of the polyester type resin A and the polyester type resin B, and more desirably, more than 30% by mass and not more than 70% by mass on the basis of the total mass of the polyester type resin A and the polyester type resin B. When the content of polyester type resin A is less than 10% by mass, the peel-off property tends to deteriorate. On the other hand, when the content of polyester type resin A exceeds 70% by mass, the durability of the protective layer tends to deteriorate since the content of the polyester type resin B becomes lower as the increment of the polyester type resin A. As the result, the durability of the print which is obtained by transferring the transfer layer which includes the protective layer tends to deteriorate.

In addition, when using a polyester type resin A1 having a number average molecular weight (Mn) of not less than 2000 and not more than 4000, and a polyester type resin A2 having a number average molecular weight (Mn) of more than 4000 and not more than 10000, in combination with the polyester type resin B, and adjusting appropriately the contents of the polyester type resin A1 and the polyester type resin A2, it is possible to further improve the peel-off property. In addition, it is also possible to impart the transferring property and the durability at adequate levels. Therefore, it can be said that the protective layer 3 where at least above-mentioned three types of the polyester type resins are contains as the two or more kinds of the binder resins is an optimal embodiment of the present invention. The preferred content of the polyester type resin A1 is in the range of not less than 5% by mass and not more than 65% by mass on the basis of the total mass of the polyester type resin A1, polyester type resin A2 and the polyester type resin B. The preferred content of the polyester type resin A2 is in the range of not less than 5% by mass and not more than 65% by mass on the basis of the total mass of the polyester type resin A1, polyester type resin A2 and the polyester type resin B. Further, it is preferable that the total mass of the polyester type resin A1 and the polyester type resin A2 is in the range of not less than 10% by mass and not more than 70% by mass on the basis of the total mass of the polyester type resin A1, polyester type resin A2 and the polyester type resin B.

However, the preferable exemplifications as mentioned above are not intended to limit the kinds of the resins included in the protective layer 3 which constitutes the transfer layer 2, nor to limit the physical properties of the resin. As described above, as long as the sum total (Σ) satisfies the above-mentioned conditions with respect to the binder resins contained in the protective layer 3, the peel-off property of the transfer layer can be made good as compared with the transfer layer which contains the conventional protective layer, and further, the durability of the print which is obtained by transferring the transfer layer on the transfer receiving article can be made favorable.

In addition, an ionizing radiation-curable resin, which contains a blend of two or more kinds of binder resins which have mutually different number average molecular weights (Mn), and wherein a sum total (Σ) of products, each product being calculated by multiplying the number average molecular weight (Mn) of individual binder resin "i" and its content ratio "r" in the blend (based on the mass) together, satisfies the above mentioned conditions, is suitable as the binder resin contained in the protective layer 3, in view of their superior plasticizer resistance and superior abrasion resistance. There is no particular limitation with respect to the ionizing radiation-curable resin, and thus it can be suitably selected from among the ionizing radiation-curable resins known in the art, and, for instance, it is possible to use the one in which a radically polymerizable polymer or oligomer is cross-linked and cured by irradiation of ionizing radiation, and optionally polymerized and cross-linked by electron beam or ultraviolet light with using a photo-polymerization initiator additively.

As an ultraviolet ray absorbing resin, for instance, a resin which is prepared by reacting and linking a reactive ultraviolet ray absorbing agent to a thermoplastic resin or the ionizing radiation-curable resin mentioned above can be used. More concretely, those which prepared by introducing a reactive group such as an addition-polymerizable double bond (for instance, vinyl group, acryloyl group, methacryloyl group, etc.), alcoholic hydroxyl group, amino group, carboxyl group, epoxy group, isocyanate group, etc., into a non-reactive organic ultraviolet absorbing agent known in the art such as salicylate series, benzophenon series, benzotriazole series, substituted acrylonitrile series, nikkel-chelate series, hindered amine series, etc., can be exemplified.

The protective layer 3 may also contain various fillers, fluorescent whitening agents, ultraviolet absorbers for improving the weather resistance, and any other materials, in addition to the blend of two or more kinds of binder resins wherein the sum total (Σ) is in the range of not less than 3000 and not more than 17000.

(Other Optional Components)

The protective layer 3 may contain further other optional components. For example, in the embodiment shown in FIG. 1, with respect to the protective layer 3, a peelable property from the substrate sheet 1 is required. Thus, in this embodiment, it is preferable that the protective layer 3 contains a component having a peelable property. Alternatively, the role of the peelable property can also be supplemented by an additional layer, as shown in FIG. 2. For example, between the substrate sheet 1 and the protective layer 3, an exfoliate layer 5 which can meet the peelable property may be provided. In such a case, the protective layer 3 does not necessarily require to include the component having the peelable property.

"Component having a Release Property from the Substrate Sheet"

As the component excellent in peelable property from the substrate sheet 1, for instance, a thermoplastic resin which includes cellulose derivatives such as ethyl cellulose, nitro cellulose, and cellulose acetate, acrylic resins such as polymethyl methacrylate, polyethyl methacrylate, polybutyl methacrylate, a polyvinyl chloride or a vinyl copolymers such as vinyl chloride-vinyl acetate copolymer, and polyvinyl butyral; or a thermosetting resin which includes saturated or unsaturated polyester resins, polyurethane resins, thermally cross-linkable epoxy-amino resins, and amino alkyd resins; or silicone waxes, silicone resins, modified silicone resins, fluorine resins, modified fluorine resins, or polyvinyl alcohols, etc., may be enumerated. Further, in order to improve the peel-off property of the transfer layer 2 which includes the protective layer 3, it is preferable that the protective layer 3 contains a filler such as micro-silica and polyethylene wax. Herein, as the component excellent in peelable property from the substrate sheet 1, it is possible to use one kind of, or two or more kinds of the above exemplified resins. In addition to the above exemplified resin(s), the protective layer 3 may include a cross-linking agent such as isocyanate, a catalyst such as tin-based catalyst and aluminum-based catalyst.

In the present invention, by adopting the protective layer 3 as described above, the peel-off property of the transfer layer which includes the protective layer 3 can be made better, and the thickness of the protective layer can be made thicker as compared with the thickness of the conventional protective layer. By increasing the thickness of the protective layer, an improvement in durability due to the increased thickness can be also expected, in addition to the durability which is imparted by the blend of two or more kinds of binder resins wherein the sum total ($\Sigma$) is in the range of not less than 3000 and not more than 17000. Moreover, even if the thickness of the protective layer 3 is reduced, it is possible to satisfy the durability of the print which is obtained by transferring the transfer layer which includes the protective layer, owing to the blend of two or more kinds of binder resins wherein the sum total ($\Sigma$) is in the range of not less than 3000 and not more than 17000. There is no particular limitation on the thickness of the protective layer 3. When the thickness of the protective layer 3 is more than 30 μm, however, the peel-off property of the transfer layer 2 which includes the protective layer 3 tends to deteriorate. On the contrary, when the thickness of the protective layer 3 is less than 1 μm, the durability of the protective layer 3 tends to deteriorate, and as the result, the durability of the print which is obtained by transferring the transfer layer which includes the protective layer tends to deteriorate. Therefore, considering these points, it is preferable that the thickness of the protective layer 3 is not less than 1 μm and not more than 30 μm. The same is applicable to the preferred thickness of the protective layer 53 of the intermediate transfer medium used in the combination of the intermediate transfer medium and the thermal transfer sheet described later.

The protective layer 3 may be formed by dissolving or dispersing the blend of two or more kinds of binder resins wherein the sum total ($\Sigma$) is in the range of not less than 3000 and not more than 17000, and optionally, other binder resin(s) and various additives if necessary, into a suitable solvent in order to prepare a coating liquid for the protective layer; coating thus prepared coating liquid onto the substrate sheet 1 (or onto the exfoliate layer 5 which is optionally provided on the substrate sheet 1), in accordance with a known coating procedure such as the gravure printing method, the screen printing method, the reverse roll coating method using a gravure plate, or the like; and then drying the coated liquid.

(Receiving Layer)

As shown in FIGS. 1 and 2, on the protective layer 3, a receiving layer 4 is provided. On the receiving layer, an image will be formed by thermal transfer from a thermal transfer sheet having a coloring agent layer in accordance with the thermal transfer method. Then, the transfer layer 2 of the intermediate transfer medium, on which the image have been thus formed, is re-transferred onto a transfer receiving article. As a result, a print is produced. Therefore, as a material for forming the receiving layer 4, it is possible to adopt any resin material which can easily receive thermally-transferable colorants such as subliming dyes or thermally-fusible inks. For example, polyolefin type resins such as polypropylene; halogenated resins such as polyvinyl chloride and polyvinylidene chloride; vinyl type resins such as polyvinyl acetate, vinyl chloride-vinyl acetate copolymer, ethylene-vinyl acetate copolymer and polyacrylic ester; polyester resins such as polyethylene terephthalate and polybutylene terephthalate; polystyrene type resins; polyamide type resins; copolymer type resins of an olefin such as ethylene or propylene and another vinyl polymer; ionomer or cellulose-based resins such as cellulose diastase; polycarbonate; etc., are exemplified. In particular, vinyl chloride type resin, acryl-styrene type resin or a polyester resin is preferred.

In the embodiments shown in FIGS. 1 and 2, since the receiving layer 4 is located on the outermost surface of the intermediate transfer medium, when removing the transfer layer in a predetermined area by the peel-off layer of the thermal transfer sheet, or when re-transferring the transfer layer of which the predetermined region has been removed by the peel-off layer to the transfer receiving article, the receiving layer 2 comes to contact directly with the peel-off layer or the transfer receiving article. Therefore, when such a structure is adopted, it is preferable that the receiving layer 4 itself has an adhesive property. By giving the adhesive property to the receiving layer 4, it is possible to improve the adhesion between the peel-off layer of the thermal transfer sheet and the transfer layer 2, which is followed by a further improvement in the peel-off property. Also, it is possible to re-transfer the transfer layer 2 onto the transfer receiving article with a good adhesiveness. Here, when the transfer receiving article takes measures for the adhesion to the transfer layer 2, the receiving layer itself does not necessarily have the adhesive property. Alternatively, instead of giving an adhesive property to the receiving layer 4 itself, an adhesive layer (not shown) may be provided on the receiving layer 4.

As the material of the receiving layer 4 having the adhesive property, resin materials having the adhesive property, for instance, vinyl chloride-vinyl acetate copolymers, acryl type resins, vinyl type resins, polyester type resins, urethane type resins, polyamide type resins, epoxy type resins, rubber-based resins, ionomer resin, and the like, may be enumerated. The optional adhesive layer may be used the same materials as mentioned above.

The receiving layer 4 can be formed by dissolving or dispersing a material or plural materials selected from the above-mentioned materials, and optionally in combination with various additives, into an appropriate solvent such as water or an organic solvent in order to prepare a coating liquid for the receiving layer, coating thus prepared coating liquid for the receiving layer in accordance with a known procedure such as gravure printing method, screen printing method, or reverse-coating method using a gravure plate, etc., and then drying the coated film. The coating amount is usually about 1 g/m$^2$- about 10 g/m$^2$ in a dried state.

(Exfoliate Layer)

Figure 9:
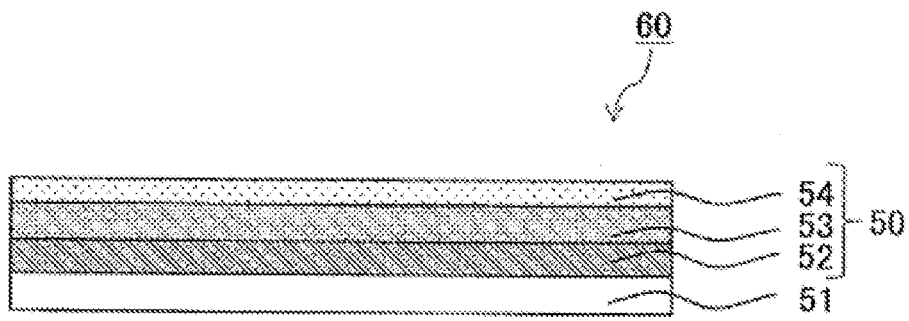
FIG. 9 is a schematic sectional view showing another embodiment of the intermediate transfer medium used in the combination of the invention.

As shown in FIG. 2, it is possible to provide an exfoliate layer 5 (in the case of the combination of the intermediate transfer medium and the thermal transfer sheet according to the present invention shown in FIG. 9, an exfoliate layer 52 of the intermediate transfer medium 60), between the substrate sheet 1 (in the case of the combination of the intermediate transfer medium and the thermal transfer sheet according to the present invention shown in FIG. 9, an substrate 51 of the intermediate transfer medium 60) and the protective layer 3 (in the case of the combination of the intermediate transfer medium and the thermal transfer sheet according to the present invention shown in FIG. 9, a protective layer 53 of the intermediate transfer medium 60), optionally, in order to improve the exfoliation of the transfer layer 2 from the substrate sheet 1, and to improve the peel-off property. This exfoliate layer 5 (52) is transferred together with the protective layer 3 (53) and the receiving layer 4 (54) onto the transfer receiving article when the transfer layer 2 (50) is transferred onto the transfer receiving article, and it is an optional layer of the transfer layer 2 (50). When the exfoliate layer 5 (52) is provided, it is possible to improve the exfoliation of the transfer layer 2 (50), and also possible to improve further the durability of the print due to a synergistic effect of this exfoliate layer (52) with the protective layer 3 (53). Therefore, it is preferable to provide the exfoliate layer 3. Further, due to the presence of the exfoliate layer 5 (52), it is possible to improve the peel-off property. Although the mechanism of the improvement in the peel-off property of the transfer layer 2 (50) by the presence of the exfoliate layer 5 (52) has not been fully clarified yet, since the peel-off property of the transfer layer 2 (50) is correlated with the exfoliation of the protective layer 3 (53) form the substrate sheet 1 (51) when removing the transfer layer 2 (50) by using the peel-off layer, the peel-off property of the transfer layer 2 (50) is, assumedly, further improved by enhancing the exfoliation of the protective layer 3 (53) at the initial stage of the peel-off by means of the exfoliate layer.

As the material for the exfoliate layer 5, various conventionally known materials, for instance, a thermoplastic resin which includes cellulose derivatives such as ethyl cellulose, nitro cellulose, and cellulose acetate, acrylic resins such as polymethyl methacrylate, polyethyl methacrylate, polybutyl methacrylate, a polyvinyl chloride or a vinyl copolymers such as vinyl chloride-vinyl acetate copolymer, and polyvinyl butyral; or a thermosetting resin which includes saturated or unsaturated polyester resins, polyurethane resins, thermally cross-linkable epoxy-amino resins, and amino alkyd resins; or silicone waxes, silicone resins, modified silicone resins, fluorine resins, modified fluorine resins, or polyvinyl alcohols, etc., may be enumerated. Further, in order to improve the peel-off property of the exfoliate layer 5, it is preferable that the exfoliate layer contains a filler such as micro-silica and polyethylene wax. Herein, the exfoliate layer 5 may be made of one kind of resin, or may be made of two or more kinds of resins. The exfoliate layer 5 may be formed by using a cross-linking agent such as isocyanate, a catalyst such as tin-based catalyst, aluminum-based catalyst, in addition to the resin(s) mentioned above.

The exfoliate layer 3, which is optionally provided if necessary, may be formed by coating a coating liquid, which has prepared by dispersing or dissolving the above-mentioned resin into a solvent in advance, onto at least a part of the surface of the substrate sheet 1 in accordance with a known coating procedure such as roll coating, gravure coating, and bar coating, and then drying it. As the thickness of the exfoliate layer 5, it may be generally in the range of about 0.1 μm-5 μm, and preferably in the range of about 0.5 μm-2 μm.

(Plasticizer Resistive Layer)

In order to improve the plasticizer resistance of the transfer receiving article to which the transfer layer 2 was transferred, a plasticizer resistive layer (not shown) may be provided between the substrate sheet 1 and the protective layer 3 (in the case that the exfoliate layer 5 is provided, it may be provided between the exfoliate layer 5 and the protective layer 4). As the plasticizer resistive layer, a substance which repels the plasticizer component, or a substance which gives the plasticizer component difficulties in reaching the printed image, can be preferably used. As the above-mentioned substance which repels the plasticizer component, for instance, polyvinyl alcohol resin, polyvinyl butyral resin, polyvinyl acetal resin, polyvinyl pyrrolidone resin, etc., can be enumerated. As the substance which gives the plasticizer component difficulties in reaching the printed image, cationic resins such as cationic urethane emulsion, etc., can be enumerated. These substances may be used solely on an individual basis, or may be used as a mixture of two or more of them in combination.

In addition, with respect to polyvinyl alcohol resin, polyvinyl butyral resin, and polyvinyl acetal resin, which has been exemplified as the substance which repels the plasticizer component, it is preferable to have a saponification degree in the range of 30-100%, and more desirably, to have a saponification degree in the range of 60-100%. When the polyvinyl alcohol resin, polyvinyl butyral resin, or polyvinyl acetal resin, which has a saponification degree in the above-mentioned range, is contained in the plasticizer resistive layer, it can be expected to improve further the plasticizer resistance of the transfer layer 2. Herein, the "saponification degree" used in the present invention refers to the value obtained by dividing the number of moles of vinyl alcohol structures in the polymer by the number of moles of all monomers in the polymer. Further, it is preferable that the substance which repels the plasticizer component, or the substance which gives the plasticizer component difficulties in reaching the printed image is contained in the plasticizer resistive layer so that the weight of the substance is in the range of 20-100% by weight on a base of the total weight of the plasticizer resistive layer.

Further, if necessary, it is possible to add to the plasticizer resistive layer, any additives, for example, lubricants, plasticizers, fillers, antistatic agents, anti-blocking agents, cross-linking agents, antioxidants, UV absorbers, light stabilizers, colorants such as dyes and pigments, fluorescent whitening agents, etc. As the method for forming the plasticizer resistive layer which is optionally provided if necessary, such a procedure in which one or more members of the substances exemplified as above, and optionally, any various material which are added if necessary, are dissolved or dispersed in an appropriate solvent in order to prepare a coating liquid for plasticizer resistive layer, and the coating liquid thus prepared is coated on the substrate sheet 1, or on the exfoliate layer 5 which is optionally provided if necessary, and then the coated film is dried, may be applicable. Although there is no particular limitation on the thickness of the plasticizer resistive layer, the plasticizer resistive layer is usually about 0.1 μm-50 μm in thickness after drying, and preferably, about 1 μm-20 μm in thickness after drying.

(Back Face Layer)

In addition, for the purpose of improving the thermal resistance and giving the driving stability to the thermal head on printing, a back face layer (not shown) may be provided on the other surface of the substrate 1 which is opposite to the surface onto which the protective layer 3 is provided. Incidentally, the back face layer is an optional constituent in the intermediate transfer medium 10 according to the present invention.

The back face layer may be formed by selecting and using resin(s) from the conventionally known thermoplastic resins and the like, appropriately. As the thermoplastic resin to be included in the back face layer, for instance, polyester type resins, polyacrylic ester type resins, polyvinyl acetate type resins, styrene acrylate type resins, polyurethane type resins, polyolefin type resins such as polyethylene type resins and polypropylene type resins, polystyrene type resins, polyvinyl chloride type resin, polyether type resin, polyamide type resins, polyimide type resins, polyamide imide type resin, polycarbonate type resin, polyacrylamide type resins, polyvinyl chloride type resin, polyvinyl butyral type resin, polyvinyl acetal type resins such as polyvinyl acetoacetal type resins, etc.; and silicone modified forms of these thermoplastic resins, may be enumerated. Among them, polyamide imide type resin and silicone modified form thereof are preferably used, in consideration of the heat resistance and so on.

Further, it is preferable that the back face layer contains various additives for improving slipping property, for instance, release agent such as waxes, higher fatty acid amides, phosphoric ester compounds, metal soaps, silicone oils, surfactants, etc; organic powder such as fluorine-containing resin, etc; and inorganic powder such as silica, clay, talc, calcium carbonate; in addition to the thermoplastic resin as mentioned above. Particularly, it is preferable to contain at least one of the phosphoric ester compound and metal soap.

The back face layer may be formed by dissolving or dispersing the above mentioned the thermoplastic resin, and optionally, various additives if necessary, into a suitable solvent in order to prepare a coating liquid; coating thus prepared coating liquid onto the substrate sheet 1, in accordance with a known coating procedure such as the gravure printing method, the screen printing method, the reverse roll coating method using a gravure plate, or the like; and then drying the coated liquid. It is preferable that the thickness of the back face layer 5 is in the range of about 0.1 $g/m^2$-about 5 $g/m^2$, and more desirably, in the range of about 0.3 $g/m^2$-about 2.0 $g/m^2$, from the viewpoint of improvement in the heat resistance or the like.

<<Thermal Transfer Sheet>>

Figure 3:
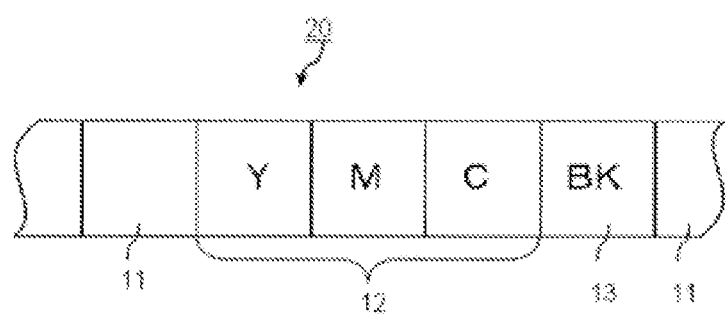
FIG. 3 is a schematic plan view showing an embodiment of a thermal transfer sheet used in the present invention.

Next, a thermal transfer sheet which is used when removing the transfer layer of the intermediate transfer medium 10 according to the present invention will be described. FIG. 3 is a schematic plan view showing an embodiment of a thermal transfer sheet 20 to be used in the present invention. As shown in FIG. 3, the thermal transfer sheet used when removing the transfer layer 2 in combination with the intermediate transfer medium 10 of the present invention takes a construction, where individual dye layers 12 of yellow (Y), magenta (M) and cyan (C), fusible layer 13 of black (BK), and peel-off layer 11, are repeatedly formed on the same surface of the substrate layer, so as to be layered in parallel on the substrate across the surface of the substrate, as being frame sequentially and divided by colors. Incidentally, it is also possible to use a thermal transfer sheet wherein individual dye layers 12 of yellow (Y), magenta (M) and cyan (C), and the fusible layer 13 of black (BK) are not provided, but only the peel-off layer 11 is provided on the substrate layer. Further, it is also possible to provide a back face layer on the other surface of the substrate layer in order to prevent fusing of the thermal transfer sheet to a heating means, such as a thermal head, and to improve the slidability of the thermal transfer sheet.

Next, the respective layers which constitute the thermal transfer sheet 20 will be explained.
(Substrate Layer)

The substrate layer 14 constituting the thermal transfer sheet is not particularly limited. Concrete examples of preferred substrate layer include: tissue papers, such as glassine paper, capacitor paper, and paraffin paper; and stretched or unstretched films of various plastics, for example, polyesters having high heat resistance such as polyethylene terephthalate, polyethylene naphthalate, polybutylene terephthalate, polyphenylene sulfide, polyether ketone, and polyether sulfone; polypropylenes, polycarbonate, cellulose acetates, polyethylene derivatives, polyvinyl chloride, polyvinylidene chloride, polystyrenes, polyamides, polyimides, polymethylpentene, and ionomers. Composite films obtained by laminating two or more of these materials can be also used. The thickness of the substrate layer may be properly selected depending on the kind of the material for the substrate layer, so that the strength, heat resistance and the like of the substrate sheet lie inappropriate ranges. In general, however, about 1 µm-25 µm in thickness is preferably used.
(Back Face Layer)

As the resins usable for the backside layer, for instance, natural or synthetic resins, for example, cellulosic resins, such as ethyl cellulose, hydroxy cellulose, hydroxypropyl cellulose, methyl cellulose, cellulose acetate, cellulose acetate butyrate, and nitro cellulose; vinyl type resins, such as polyvinyl alcohol, polyvinyl acetate, polyvinyl butyral, polyvinyl acetal, and polyvinyl pyrrolidone; acrylic resins, such as polymethyl methacrylate, polyethyl acrylate, polyacrylamide, and acrylonitrile-styrene copolymer; polyamide resin; polyvinyltoluene resin; coumarone-indene resins; polyester resins; polyurethane resins; and silicone-modified or fluorine-modified urethanes are exemplified. These resins may be used either solely on an individual basis, or may be used as a mixture of two or more of them in combination. In order to further enhance the heat resistance of the back face layer, preferably, among the above resins, a resin containing a reactive group based on a hydroxyl group is used in combination with polyisocyanate or the like as a crosslinking agent to form a cross-linked resin layer.

In order to impart slidability against the thermal head, a solid or liquid release agent or lubricant may be added to the back face layer 15 to impart heat-resistant slipperiness to the back face layer. As the release agent or the lubricant for example, various waxes, such as polyethylene wax and paraffin wax, higher aliphatic alcohols, organo polysiloxanes, anionic surfactants, cationic surfactants, amphoteric surfactants, nonionic surfactants, fluorine type surfactants, organic carboxylic acids and derivatives thereof, fluorine type resins, silicone type resins, and fine particles of inorganic compounds such as talc, and silica, may be used. The content of the lubricant in the back face layer is about 5%-50% by mass, preferably about 10%-30% by mass.

There is no particular limitation for the method of forming the back layer 15. The back face layer may be formed by dissolving or dispersing the above resin, optionally in combination with a release agent, a lubricant and the like, in an appropriate solvent in order to prepare a coating liquid, coating the coating liquid by a conventional coating method, such as gravure coating, roll coating, or wire bar coating, and drying the coated film. The coating amount of the back face layer is about 0.1 $g/m^2$-about 10 $g/m^2$ in a dried state.
(Dye Layer)

Sublimable dye layer 12 is formed from a coating liquid containing a sublimable dye, a binder resin, and other optional ingredients. The sublimable dye, the binder resin and the like may be conventional ones and are not particularly limited. The dye layer may be formed by a conventional method, for example, by preparing a coating liquid for a dye layer, coating the coating liquid onto a substrate layer by means such as gravure printing and drying the coated liquid. The coating amount of the dye layer is about 0.2 $g/m^2$-about 3 $g/m^2$ in a dried state.

(Fusible Layer)

The fusible layer 13 may be formed using the same thermally-fusible ink as used in the prior art. If necessary, various additives may be added to the fusible ink. These materials may be conventional ones and are not particularly limited. The fusible layer may be formed by coating the thermally-fusible ink onto the substrate film by a coating method such as hot-melt coating. The thickness of the fusible layer is determined from a relationship between necessary density and thermal sensitivity and is generally preferably in the range of about 0.2 µm to 10 µm.

(Peel-Off Layer)

The peel-off layer 11 is provided on the substrate layer, and it is superposed on the intermediate transfer recording medium 10 to be brought into contact with the transfer layer 2 of the intermediate transfer medium 10, and the assembly is then heated to remove the transfer layer 2 in its predetermined region 9 from the intermediate transfer medium 10. The peel-off layer may be formed of any of conventional pressure-sensitive adhesives or heat-sensitive adhesives, preferably formed of a thermoplastic resin having a glass transition temperature (Tg) of 50° C.-120° C. For instance, it is preferable that a resin having a suitable glass transition temperature is selected from resins having good thermal adhesion, such as vinyl chloride resins, vinyl chloride-vinyl acetate copolymer resins, acrylic resins, polyester resins, polyamide resins, styrene-acryl resins, styrene-vinyl chloride-vinyl acetate copolymers, butyral resins, epoxy resins, and polyamide resins. When the transfer layer 2 of the intermediate transfer medium 10 is removed by using the peel-off layer in advance, it is possible to reliably prevent the transfer of the transfer layer to a transfer non-acceptance region, such as a region allocated for an IC chip, or a signature portion and the like, of the transfer receiving article 30, and thus, the function of the ancillary product 31 such as the IC chip and the signature portion is not impaired.

The peel-off layer may be formed by adding optional additives, such as inorganic or organic fillers, to the resin for forming the peel-off layer to prepare a coating liquid, coating the coating liquid by a conventional method, such as gravure coating, gravure reverse coating, or roll coating, and drying the coated liquid. The coating amount is preferably about 0.1 g/m$^2$-about 5.0 g/m$^2$ in a dried state. When the coating amount of the peel-off layer is less than 0.1 g/m$^2$, the adhesion of the peel-off layer which is necessary for stripping off the transfer layer in its predetermined region in the intermediate transfer medium is disadvantageously almost lost. Further, in some cases, the thermal transfer sheet is cut off to be broken. When the coating amount of the peel-off layer is too large, the heat sensitivity of the peel-off layer comes to be unsatisfactory. This causes a deterioration in adhesion of the peel-off layer to the transfer layer of the intermediate transfer medium, and, disadvantageously, a part of the region to be removed in the transfer layer cannot be stripped off.

(Transfer Receiving Article)

Onto the transfer receiving article 30, the transfer layer 2 of the above-mentioned intermediate transfer medium, in which the thermal transfer image has been formed, is transferred. As a result, it is possible to obtain a print which excels in various durability. As the transfer receiving article to which the intermediate transfer medium according to the present invention can be applied, there is no particular limitation, and for instance, any of natural fiber paper, coated paper, tracing paper, plastic films which are not deformed upon exposure to heat at the time of transfer, glasses, metals, ceramics, woods, cloths, and so on, may be utilized.

The shapes and applications of the transfer receiving article 30 are also not limited, and examples thereof include: gold notes, such as stock certificates, securities, deeds, passbooks, railway tickets, betting tickets, stamps, postage stamps, appreciation tickets, admission tickets, and other tickets; cards, such as bank cards, credit cards, prepaid cards, membership cards, greeting cards, postcards, business cards, driver's licenses, IC cards, and optical cards; cases, such as cartons and containers; bags; forms control; envelops; tags; OHP sheets; slide films; bookmarks; calendars; posters; pamphlets; menus; POP goods; coasters; displays; name plates; keyboards; cosmetics; accessories such as wristwatches and lighters; stationeries such as report pads; passports, small books, magazines, and other booklets; building materials; panels; emblems; keys; cloths; clothes; footwears; equipment or devices such as radios, televisions, electronic calculators, and OA equipment; various sample or pattern books; albums; and outputs of computer graphics and outputs of medical images; and the like, regardless of their kinds.

Ancillary products, such as an IC chip, a signature portion, a sealing part, and a holo-CI mark part, are preferably provided on the surface of the transfer receiving article 30 in order to add values to the transfer receiving article. The covering of the ancillary product with the transfer layer 2 from the intermediate transfer medium 10 is unfavorable because the presence of the transferred material even in a small amount on the ancillary product 31 hinders the function of the ancillary product.

Figure 4:
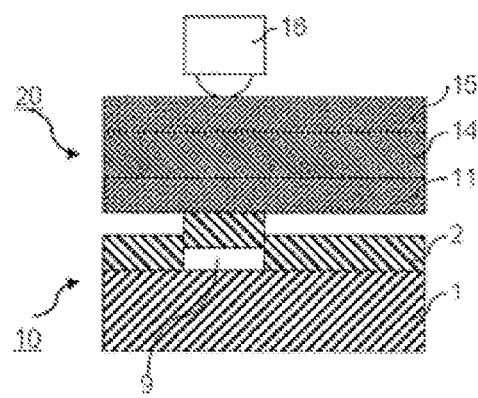
FIG. 4 is a schematic view for explaining the intermediate transfer medium of the present invention.

FIG. 4 is a schematic view for explaining the intermediate transfer medium 10 of the present invention. As shown in FIG. 4, when the intermediate transfer medium 10, wherein the transfer layer 2 which includes the receiving layer and the protective layer, etc., are provided on the substrate sheet 1 so as to be able to be separated from the substrate sheet 1, and the thermal transfer sheet 20, wherein the peel-off layer 11 is provided on the other surface of the substrate layer 14 which is opposite to the surface onto which the back face layer 15 is provided, are superimposed mutually so that the peel-off layer 11 is brought into contact with the transfer layer 2, and then the superimposed assemble is heated by the thermal head 16, it is possible to remove the transfer layer 2 in its predetermined region 9 from the intermediate transfer recording medium 10. Incidentally, on the transfer layer 2 of the intermediate transfer medium as mentioned above, a thermally transferrable image of the sublimable type or the fusible type is previously formed.

Figure 5:
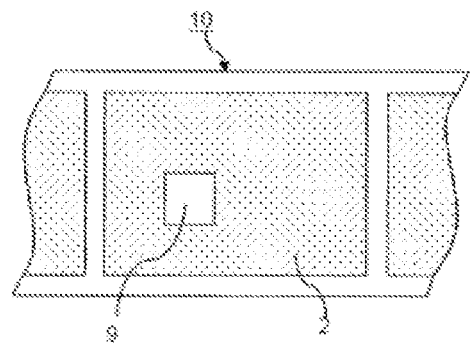
FIG. 5 is a schematic plan view of an intermediate transfer medium of the present invention.

FIG. 5 is a schematic plan view of an intermediate transfer medium 10 of the present invention. As shown in FIG. 5, in the intermediate transfer medium 10, the predetermined region 9 is removed from the transfer layer 2 which is provided with the receiving layer onto which thermal transferred image has been formed. As examples of the region to be removed in the transfer layer 2 will be explained later in detail in the description about the combination of the intermediate transfer medium and the thermal transfer sheet of the present invention.

Figure 6:
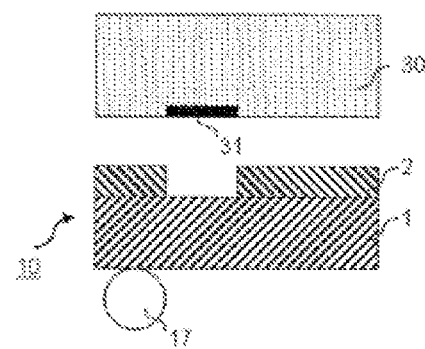
FIG. 6 is a schematic view for explaining the intermediate transfer medium of the present invention.

FIG. 6 is a schematic view for explaining the intermediate transfer medium of the present invention. As shown in FIG. 6, while the removed region in the transfer layer 2 of the intermediate transfer medium 10 is aligned with a region of the transfer receiving article 30, at which the ancillary product 31 such as the IC chip and the signature portion is provided and which is the region that will cause an disadvantage if the transfer layer 2 is transferred thereon from the intermediate transfer medium 10, the transfer receiving article 30 is superimposed to the intermediate transfer medium 10, and then the assemble is heated by a heating device as a heat roll 17 so as to re-transfer the transfer layer 2 onto the transfer receiving article 30. At the time of this re-transfer, the transfer layer 2 is not transferred onto the ancillary product 31 provided in the transfer receiving article 30.

The heating device used for image formation by the thermal transfer and the heating device used for heating of the peel-off layer and the transfer layer are not limited to the thermal head. For example, heating device using a light source or a laser beam source, etc., may be used. In addition, the heating device used for re-transferring the transfer layer 2, the predetermined part of which has been removed by the peel-off layer, onto the transfer receiving article is not limited to the heat roll method, and, for example, a hot stamping method, a thermal head method, etc., may be used.

By the way, as one problem on the conventional image formation, a problem caused by the transferring property has been known. Assuming that the transferring property of the transfer layer is low, for example, when the transfer layer of the intermediate transfer medium is retransferred onto the transfer receiving article 30 such as a card, phenomena in which the intermediate transfer medium emerges from the printer while a part of the transfer layer which is to be re-transferred to the transfer receiving article is remaining on the emerged intermediate transfer medium, or otherwise the part is fallen off from the intermediate transfer medium within the printer, may be caused. These are causative of a deterioration in quality of the print.

Considering this point, in a preferred embodiment of the present invention, in order to eliminate the above drawback, the step of previously removing the transfer layer at the portion, which is likely to remain at the intermediate transfer medium after the retransfer, by the peel-off layer 11 is desirably provided. With respect to the intermediate transfer medium 10 of the present invention, as described above, an improvement in the peel-off property of the protective layer 3 has been achieved, and thus, it is particularly suitable for employing the step. In the above, the present invention has been described mainly with the embodiment where the intermediate transfer medium of the present invention is used in combination with the thermal transfer sheet having the peel-off layer, and by means of the peel-off layer, a part of the transfer layer of the intermediate transfer medium is removed. However, the intermediate transfer medium of the present invention is not limited to such a application. Concretely, since the intermediate transfer medium of the present invention can re-transfer the transfer layer 2 onto the transfer receiving article without causing a problem and has transferring property, the intermediate transfer medium of the present invention can be also used for applications where the transfer layer 2 of the intermediate transfer layer is re-transferred onto the transfer receiving article without a step of removing a part of the transfer layer 2 by means of the peel-off layer.

<<Combination of Intermediate Transfer Medium and Thermal Transfer Sheet>>

Next, the combination of intermediate transfer medium and thermal transfer sheet according to the present invention will be explained.

<Intermediate Transfer Medium used in the Combination of the Present Invention>

Figure 8:
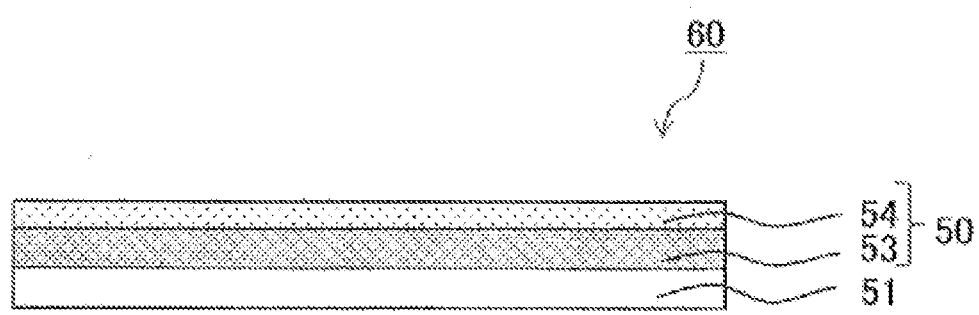
FIG. 8 is a schematic sectional view showing an embodiment of the intermediate transfer medium used in the combination of the invention.

FIG. 8 is a schematic sectional view showing an embodiment of the intermediate transfer medium used in the combination of the invention (hereinafter, it is referred to as an "intermediate transfer medium used in the present invention".) As shown in FIG. 8, the intermediate transfer medium 60 according to the present invention comprises a substrate sheet 51, and a transfer layer 50 which is formed on one surface side of the substrate sheet 51 (regarding the embodiment shown in this figure, on the upper face side of the substrate sheet 51). The transfer layer 50 has a layered structure of a protective layer 53 and a receiving layer 54 which are layered in this order from the side of the substrate sheet 51. The protective layer 53 and the receiving layer 54 are the layers which are transferred to a transfer receiving article at the time of thermal transfer. Namely, the transfer layer 50 is the layer which is transferred to a transfer receiving article at the time of thermal transer. Here, in the embodiment shown in FIG. 2, an exfoliate layer 52 is provided between the substrate 51 and the protective layer 53. The exfoliate layer 52 is an optional layer in the intermediate transfer medium 60 used in the present invention, and which is included in the transfer layer. Namely, the intermediate transfer medium 60 used in the present invention can take the same configuration as the above-mentioned intermediate transfer medium 10 of the present invention. Hereinafter, the intermediate transfer medium 60 used in the present invention will be explained with focusing on differences between intermediate transfer medium 60 and the above-mentioned intermediate transfer medium 10 of the present invention.

(Substrate)

The substrate 51 is an essential component in the intermediate transfer medium 60 used in the present invention, and it is provided in order to support the transfer layer 50, and a back face layer which is provided optionally on the other surface of the substrate 51. There is no particular limitation on the substrate 51, and for example, it is possible to use the substrate sheet 1 as described in the intermediate transfer medium 10 of the present invention can be used as it is, a detailed description for the substrate is omitted here.

(Transfer Layer)

As shown in FIG. 8, on the substrate 51, the transfer layer 50 is formed so that it is able to be separated from the substrate 51. This transfer layer 50 comprises at least the protective layer 53 and the receiving layer 54, both of which are essential constituents of the intermediate transfer medium 60 used in the present invention. The transfer layer 50 is exfoliated from the substrate 51 and is transferred to a transfer receiving article during the thermal transfer.

(Protective Layer)

On the substrate 51, the protective layer 53 is provided (regarding the embodiment shown in FIG. 9, on the exfoliate layer 52). The protective layer 53 is an essential constituent of the intermediate transfer medium 60 used in the present invention, and it constitutes the transfer layer 50.

The intermediate transfer medium 60 used in the present invention is characterized in that the protective layer 53 which constitutes the intermediate transfer medium 60 contains a polyester type resin the number average molecular weight (Mn) of which is not less than 5000 and not more than 15000, as one aspect. Hereinafter, the polyester type resin which has the number average molecular weight (Mn) of being not less than 5000 and not more than 15000 is also referred to as the "specific polyester type resin", occasionally.

It is considered that the peel-off property of the transfer layer 50 which includes a protective layer 53, and the durability of the print which is obtained by transferring the transfer layer 50 have a close relevance to the molecular weight of resin which is contained in the protective layer 53. Thus, when making the protective layer contain a resin having a large molecular weight, it is possible to improve the durability of the protective layer, and to impart a sufficient durability to the print which is prepared by transferring the transfer layer 50 which includes the protective layer onto the transfer receiving article. On the other hand, when making the protective layer 53 contain a resin having a small molecular weight, the peel-off property of the transfer layer 50 which includes the protective layer 53 is improved. That is, it can be said that the improvement in the durability of the print which is obtained by transferring the transfer layer onto the transfer receiving article and the improvement in the peel-off property of the transfer layer are in a trade-off relationship.

In the present invention, by making the protective layer 53 contain the above-mentioned "specific polyester type resin", it becomes possible to satisfy both of the durability and the peel-off property, which are in the trade-off relationship. That is, according to the combination of the present invention, it is possible to remove a desired region of the transfer layer 50 which includes a protective layer 53 by means of the peel-off layer of the thermal transfer sheet. Furthermore, it is possible to impart a high durability to the print which is obtained by transferring the transfer layer 50 in which the desired region has been removed onto the transfer receiving article.

In the present invention, not only from the protective layer 53 of the intermediate transfer medium 60, but also from the peel-off layer 105 of the thermal transfer sheet 100, approaches aimed at improving the peel-off property of the transfer layer 50 have been taken. Thus, the improvement in the peel-off property of the transfer layer 50 which includes the protective layer 53 is due to a synergistic effect of both of protective layer of the intermediate transfer medium and the peel-off layer of the thermal transfer sheet. With respect to the above-mentioned intermediate transfer medium 10 of the present invention, it is possible to improve the peel-off property regardless of the characteristics of the peel-off layer of the thermal transfer sheet, whereas with respect to the combination of the present invention, the improvement in the peel-off property is attained by the synergistic effect of both of protective layer of the intermediate transfer medium and the peel-off layer of the thermal transfer sheet. From the viewpoint for achieving the improvement in the peel-off property, both inventions are different from each other. However, the above-mentioned intermediate transfer medium of the present invention, and the combination of the intermediate transfer medium and the thermal transfer sheet of the present invention have commonalities in their problems to be solved, i.e., to improve the peel-off property on removing a part of transfer layer which includes the protective layer by the peel-off layer, to impart a high durability to the print which is obtained by transferring the transfer layer onto the transfer receiving article, and to allow the transfer layer to be re-transferred onto the transfer receiving article without any problem. With respect to the thermal transfer sheet used in the combination of the present invention will be described later.

The "specific polyester type resin" which is contained in the protective layer 53 of the intermediate transfer medium 60 used in the combination of the invention is the resin which should satisfy both conditions that (1) it is a polyester type resin, and (2) it has a number average molecular weight (Mn) of being not less than 5000 and not more than 15000. When it is not satisfied either condition, it is not possible to satisfy both of the durability and the peel-off property. Specifically, even if the protective layer contains a polyester type resin, but as long as the number average molecular weight (Mn) of the polyester type resin is less than 5000, it is not possible to satisfy the durability of the print which is obtained by transferring the transfer layer 50 which includes the protective layer 53 onto the transfer material. On the other hand, when the number average molecular weight of the polyester type resin (Mn) is more than 15000, although it is possible to satisfy the durability of the print which is obtained by transferring the transfer layer which includes the protective layer on the transfer receiving article, it becomes impossible to satisfy the peel-off property of the transfer layer which includes the protective layer even if the protective layer is in combination with the peel-off layer 105 which will be described later, it becomes impossible to satisfy the peel-off of the transfer layer comprising a protective layer. Further, even if the number average molecular weight (Mn) of the resin contained in the protective layer is not less than 5000 and not more than 15,000, but as long as the resin is a resin other than the polyester type resin, the peel-off property of the transfer layer becomes low.

In other words, the combination of the present invention is not intended to be simply focused on the number average molecular weight (Mn) of the binder resin contained in the protective layer. In order to satisfy both of the peel-off property of the transfer layer which includes the protective layer, and the durability of the print which is obtained by transferring the transfer layer which includes the protective layer onto the transfer member at the same time, by paying attention to the ingredients or kinds of the binder resin contained in the protective layer which constituted the transfer layer, its number average molecular weight (Mn), as well as the peel-off layer of the thermal transfer sheet which is used in combination with the intermediate transfer medium, the combination of the present invention has been achieved.

There is no particular limitation on the glass transition temperature (Tg) of the "specific polyester type resin" contained in the protective layer 53. In view of the blocking property of the intermediate transfer medium 60 to be used in the present invention when it is preserved in its winding condition, however, it is preferable to use as the "specific polyester type resin" the one which has a glass transition temperature (Tg) of not less than 55° C. When the glass transition temperature of the "specific polyester type resin" is less than 55° C., the blocking tends to occur as the glass transition temperature drops below. Incidentally, the glass transition temperature (Tg) used herein denotes a temperature calculated from measurement of a change of calorie (DSC method) in accordance with the DSC (differential scanning calorimetry).

Further, in the protective layer 53, any resin other than the "specific polyester type resin" may be contained. However, when the content of the "specific polyester resin" is less than 20% by mass on the basis of the total solid content of the protective layer 53, depending on the kind of the other resin contained, the durability of the print which obtained by transferring the transfer layer which includes the protective layer onto the transfer receiving sheet and the peel-off property of the transfer layer tend to become lower. Therefore, it is preferable that the content of "specific polyester resin" is not less than 20% by mass on the basis of the total solid content of the protective layer 53, and more desirably, it is not less than 30% by mass on the basis of the total solid content of the protective layer 53. The upper limit of the content of the "specific polyester resin" is not particularly limited, and it may be 100% by mass.

As the optional components, such as methacrylic acid ester copolymers, vinyl chloride-vinyl acetate copolymer, polyester resins, polycarbonate resins, acrylic resins, ultraviolet absorbing resins, epoxy resins, polystyrene resins, polyurethane resins, acrylic urethane resins, and silicone-modified forms of these resins, any blends of these resins, ionizing radiation curable resins, and ultraviolet absorbing resins, and various fillers, fluorescent brighteners, etc., may be enumerated. Among them, the ultraviolet absorbing resins can be suitably used in combination with the "specific polyester type resin" from the viewpoint of a particularly excellent scratch resistance which is owned by the ultraviolet absorbing resins.

As the ultraviolet absorbing resin, those which have been explained in relation to the protective layer 3 of the intermediate transfer medium 10 according to the present invention can be appropriately selected and used. Therefore, a detailed description for this resin is omitted here.

Further, for the purpose of further improving the abrasion resistance of the protective layer 53, the protective layer 53 may contain a lubricant in the protective layer 53. As the lubricant, for example, silicones such as modified silicone oils and silicone-modified resins; metal soaps such as zinc stearate, zinc stearyl phosphate, calcium stearate, and magnesium stearate; fatty acid amides; polyethylene waxes, carnauba waxes, paraffin waxes, and the like, can be exemplified. In addition, these lubricant components can also be contained in the protective layer 3 of the above-mentioned intermediate transfer medium 10 of the present invention.

(Other Optional Components)

The protective layer 53 may contain further other optional components. For example, in the embodiment shown in FIG. 8, with respect to the protective layer 53, a peelable property from the substrate sheet 51 is required. Thus, in this embodiment, it is preferable that the protective layer 53 contains a component having a peelable property. Alternatively, the role of the peelable property can also be supplemented by an additional layer, as shown in FIG. 9. For example, between the substrate sheet 51 and the protective layer 53, an exfoliate layer 52 which can meet the peelable property may be provided. In such a case, the protective layer 53 does not necessarily require to include the component having the peelable property. As the component having the peelable property, for example, those which have been explained as "component having a release property from the substrate sheet" in relation to the protective layer 3 of the intermediate transfer medium 10 according to the present invention can be used as they are, a detailed description for the component is omitted here.

No particular limitation is imposed on the method of forming the protective layer 53 of the intermediate transfer medium 60 used in the combination of the present invention. The protective layer 53 may be formed by dissolving or dispersing the "specific polyester type resin", and optionally, other components if necessary, into a suitable solvent in order to prepare a coating liquid for the protective layer; coating thus prepared coating liquid onto the substrate 51 or onto a certain layer which is optionally provided on the substrate 51, in accordance with a known coating procedure such as the gravure printing method, the screen printing method, the reverse roll coating method using a gravure plate, or the like; and then drying the coated liquid.

The intermediate transfer medium 60 used in the present invention, when combining with the thermal transfer sheet described later, can make the peel-off property of the transfer layer 50 which includes the protective layer 53 good, as in the case of the above mentioned intermediate transfer medium 10 of the present invention. Therefore, the thickness of the protective layer 53 can be made thicker as compared with the thickness of the conventional protective layer. By increasing the thickness of the protective layer, an improvement in durability due to the increased thickness can be also expected, in addition to the durability which is imparted by the "specific polyester type resin". Moreover, even if the thickness of the protective layer 53 is reduced, it is possible to satisfy the durability of the print which is obtained by transferring the transfer layer 50 which includes the protective layer 53, owing to the durability of the "specific polyester type resin".

(Receiving Layer)

As shown in FIGS. 8 and 9, on the protective layer 53, a receiving layer 54 is provided. As the receiving layer 54, the receiving layer 4 of the above-mentioned intermediate transfer medium of the present invention can be used as it is. Thus, a detailed description for the receiving layer is omitted here.

(Exfoliate Layer)

As shown in FIG. 9, it is possible to provide an exfoliate layer 52 between the substrate 51 and the protective layer 53, optionally, in order to improve the exfoliation of the protective layer 53 from the substrate 51, and to improve the peel-off property. As the exfoliate layer 52, the exfoliate layer 5 which has been explained in relation to the intermediate transfer medium 10 according to the present invention can be used as it is. Thus, a detailed description for the exfoliate layer is omitted here.

(Plasticizer Resistance Layer)

Also, In order to improve the plasticizer resistance of the transfer receiving article to which the transfer layer 50 was transferred, a plasticizer resistive layer (not shown) may be provided between the substrate 51 and the protective layer 53 (in the case that the exfoliate layer 52 is provided, it may be provided between the exfoliate layer 52 and the protective layer 53). The plasticizer resistance layer is an optional layer which constitutes the transfer layer 50. As the plasticizer resistance layer, the plasticizer resistance layer which has been explained in relation to the intermediate transfer medium 10 according to the present invention can be used as it is. Thus, a detailed description for the plasticizer resistance layer is omitted here.

(Back Face Layer)

In addition, for the purpose of improving the thermal resistance and giving the driving stability to the thermal head on transferring the transfer layer 50, a back face layer may be provided on the other surface of the substrate 51 which is opposite to the surface onto which the protective layer 53 is provided. Incidentally, the back face layer is an optional constituent in the intermediate transfer medium 60 used in the present invention. As the back face layer, the back face layer which has been explained in relation to the intermediate transfer medium 10 according to the present invention can be used as it is. Thus, a detailed description for the back face layer is omitted here.

<Thermal Transfer Sheet used in the Combination of the Present Invention>

Next, the thermal transfer sheet 100 used in the combination of the present invention, and used in combination with the intermediate transfer medium 60, will be described.

Figure 10:
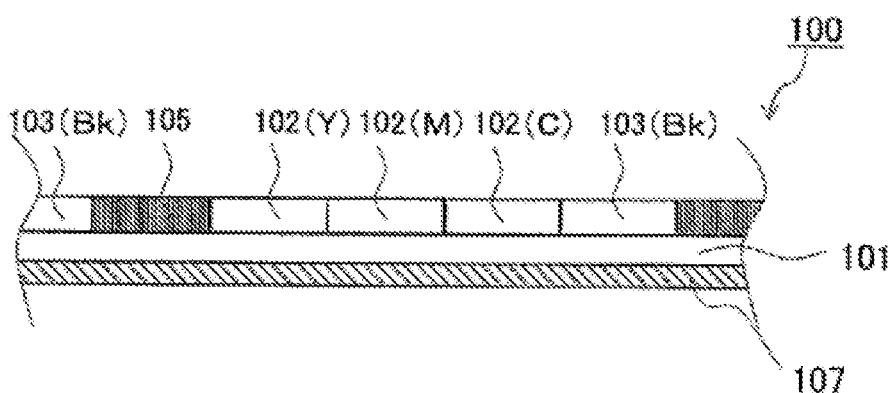
FIG. 10 is a schematic sectional view showing an embodiment of the thermal transfer sheet used in the combination of the present invention.

FIG. 10 is a schematic plan view showing an embodiment of the thermal transfer sheet 100 to be used in the present invention. As shown in FIG. 10, the thermal transfer sheet 100 which is used when removing the transfer layer of the intermediate transfer medium used in the present invention (hereinafter, it is referred to as "thermal transfer sheet 100 used in the present invention") takes a construction, where a peel-off layer 105 is formed on one surface of the substrate 101. The peel-off layer 105 is an essential configuration of the thermal transfer sheet 100 used in the present invention. In the embodiment shown in FIG. 10, individual dye layers 102 of yellow (Y), magenta (M) and cyan (C), fusible layer 103 of black (BK) are also formed on the same surface of the substrate layer 101 that the peel-off layer 105 is provided, so as to be layered in parallel on the substrate across the surface of the substrate, as being frame sequentially, and a back face layer 107 is provided on another surface of the substrate layer 101. However, all of the dye layer 102, the fusible layer 103, and the back face layer 107 are optional configurations of the thermal transfer sheet used in the present invention. Next, the respective layers which constitute the thermal transfer sheet 100 will be explained.

(Substrate Layer)

The substrate layer 101 constituting the thermal transfer sheet is not particularly limited. For instance, the substrate layer 14 of the thermal transfer sheet which has been explained in relation to the intermediate transfer medium 10 of the present invention can be used as it is. Thus, a detailed description for the substrate layer is omitted here.

(Peel-Off Layer)

As shown in FIG. 10, on one surface of the substrate layer 101, the peel-off layer 105 is provided. The peel-off layer 105 is the essential configuration of the thermal transfer sheet 100 used in the present invention. As shown in FIG. 11, when the peel-off layer 105 of the thermal transfer sheet 100 is superposed on the transfer layer 50 of the intermediate transfer medium 60 (in the embodiment shown in this figure, the transfer layer is a layered structure of the receiving layer 54 and the protective layer 53) to be brought into contact with the transfer layer 50 of the intermediate transfer medium 60, and the assembly is then heated from the backside of the thermal transfer sheet 100 by using a heating device such as the thermal head 150, the transfer layer 50 that is located at a region corresponding to the heat applied region (hereinafter, it is referred to as "transfer region".) is removed by the peel-off layer 105. The peel-off layer 50 is the layer which is intended to remove the transfer layer 50 as above fashion.

The protective layer 53 of the intermediate transfer medium 60 which is used in combination with the thermal transfer sheet 100 used in the present invention contains the "specific polyester type resin", and the improvement in the peel-off property of the transfer layer 50 is attempted by the "specific polyester type resin". In the present invention, an approach aimed at improving the peel-off property of the transfer layer 50 is also made on the part of the thermal transfer sheet 100, and the present invention is characterized in that the thermal transfer sheet which is provided with a peel-off layer 105 which includes one or more kinds of resins selected from the group consisting of acrylic resins, vinyl chloride-vinyl acetate copolymer resins and polyester resins is used, as one aspect. Hereinafter, the one or more kinds of resins selected from the group consisting of acrylic resins, vinyl chloride-vinyl acetate copolymer resins and polyester resins are collectively referred to as a "group of resins", occasionally.

The peel-off layer 105 containing the "group of resins" has a good compatibility with the protective layer 53 that contains the "specific polyester type resin", or the transfer layer 50 which includes the protective layer 53. Thus, when combining them, it is possible to make the peel-off property excellent, as compared with the case of combining the intermediate transfer medium 60 used in the present invention and a thermal transfer sheet which is provided with a peel-off layer of not having the above characteristics. Incidentally, in the case that the thermal transfer sheet which is provided with a peel-off layer which does not include the "group of resins" is used, it is impossible to improve the peel-off property sufficiently even if it is in combination with the above-above mentioned intermediate transfer medium used in the present invention.

As for the "group of resins", it is preferable to have a glass transition temperature (Tg) of not less than 50° C. and not more than 120° C. By including the "group of resins" which has a glass transition temperature (Tg) within the above mentioned range in the peel-off layer, it become possible to further improve the peel-off property. In addition, it is also possible to prevent blocking that may occur during storage of the thermal transfer sheet.

With respect to the peel-off layer 105, as long as it satisfies the condition that it contains the "group of resins", there is no particular limitation on the content of the "group of resins". However, when the content of the "group of resins" is less than 20% by mass on the basis of the total solid content of the peel-off layer 105, the peel-off property tends to decrease. Therefore, the content of the "group of the resins" is preferably not less than 20% by mass on the basis of the total solid content of the peel-off layer 105, and more, particularly, not less than 30% by mass on the basis of the total solid content of the peel-off layer 105. The upper limit of the content of the "group of resins" is not particularly limited, and it may be 100% by mass.

The peel-off layer 105 may further contain any optional components in addition to the "group of resins" As the optional components, for instance, resin components such as vinyl chloride resins, polyamide resins, styrene-acrylic resins, butyral resins, epoxy resins, and polyamide resins, etc.; and additives such as organic fillers and inorganic fillers, etc., may be enumerated.

There is no particular limitation for the method of forming the peel-off layer 105. The peel-off layer 105 may be formed by dissolving or dispersing the above-mentioned "group of resins", and if necessary, optional additives, to a suitable solvent in order to prepare a coating liquid for peel-off layer, coating the coating liquid on the substrate layer 101 by a conventional method, such as gravure coating, gravure reverse coating, or roll coating, and drying the coated liquid. There is also no particular limitation for the thickness of the peel-off layer 105. However, when the thickness is less than 0.1 μm, it tends to decrease the adhesion to remove the transfer layer 50, it is preferable that the thickness of the peel-off layer is not less than 0.1 μm and not more than 5 μm.

(Back Face Layer of the Thermal Transfer Sheet)

In the embodiment shown in FIG. 10, a back face layer 107 is provided on the other surface of the substrate layer 101 (in the embodiment shown in FIG. 10, the lower side of the substrate layer 101). The back layer 107 is an optional constituent in the thermal transfer sheet 100 used in the present invention. 10 according to the present invention. As the back face layer 107, for instance, the back face layer 15 of the thermal transfer sheet which has been explained in relation to the intermediate transfer medium 10 of the present invention can be used as it is. Thus, a detailed description for the back face layer is omitted here.

In the embodiment shown in FIG. 10, the individual dye layers 102 of yellow (Y), magenta (M) and cyan (C), and the fusible layer 103 of black (BK) are also formed on the same surface of the substrate layer 101 that the peel-off layer 105 is provided, so as to be layered in parallel on the substrate across the surface of the substrate, as being frame sequentially. The dye layer 102 and the fusible layer 103 are optional configurations of the thermal transfer sheet 100 used in the present invention.

As the dye layer 102, for instance, the dye layer 12 of the thermal transfer sheet which has been explained in relation to the intermediate transfer medium 10 of the present invention can be used as it is. Thus, a detailed description for the dye layer is omitted here.

As the fusible layer 103, for instance, the fusible layer 13 of the thermal transfer sheet which has been explained in relation to the intermediate transfer medium 10 of the present invention can be used as it is. Thus, a detailed description for the fusible layer is omitted here.

<Peel-Off Region>

Figure 12:
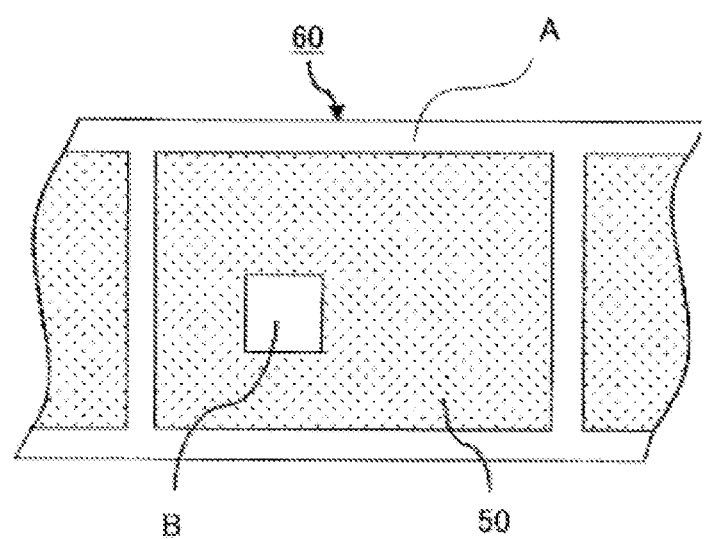
FIG. 12 is a plan view showing a transfer layer which has been removed by the peel-off layer in the combination of the present invention.

Next, referring to FIG. 12, an example of the region where the transfer layer 50 of the intermediate transfer medium 60 is intended to be removed will be described. FIG. 12 is a schematic plan view of the intermediate transfer medium 60 of the present invention, and wherein white areas (represented by symbols "A" and "B" in this figure) are the regions where the protective layer 53 has been removed off by the peel-off layer 105, and the substrate 51 has been exposed.

There is no particular limitation on the region where the transfer layer 50 is intended to be removed, for example, as indicated by the symbol "A" in FIG. 12, peripheral edges of the transfer layer to be transferred onto the transfer image receiving article can be exemplified. In other words, a region that is not transferred onto the transfer image receiving article can be removed off by the peel-off layer 105 so as to make a removing of the peripheral edges. Also, as indicated by the symbol "B" in FIG. 12, a region allocated for an ancillary product 31 such as the IC chip and the signature portion, that is, a region where an disadvantage will be caused if the transfer layer 50 is remained in the transfer receiving article onto which the transfer layer 50 is transferred can be exemplified. Incidentally, in the case that the peel-off property on removing the transfer layer 50 by mean of the peel-off layer 105 is low, problems such that the transfer layer 50 is transferred on the region where the transfer is not intended inherently when the transfer layer 50 after the peel-off is transferred onto the transfer receiving article, that the intermediate transfer medium emerges from the printer while a part of the transfer layer 50 which is to be removed off inherently is remaining on the emerged intermediate transfer medium, and that a part of the transfer layer 50 which is to be removed off inherently is fallen off within the printer, may be caused. In the present invention, as described above, since the measures for improving the peel-off property have been made on both of the protective layer of the intermediate transfer medium 60 and the thermal transfer sheet of the peel-off layer 105, the peel-off property of the transfer layer 50 becomes high, and it is possible to prevent the occurrence of these problems effectively.

<Heating Method>

The heating device used when removing a predetermined region of the transfer layer 50 by the peel-off layer 105 is not particularly limited, and the heating methods which have been described above in relation to the intermediate transfer medium 10 of the present invention can be selected appropriately and used herein.

(Transfer Receiving Article)

As for the transfer receiving article onto which the transfer layer 50 in which the predetermined area has been removed off is transferred, there is no particular limitation, and the transfer receiving article which have been described above in relation to the intermediate transfer medium 10 of the present invention can be selected appropriately and used herein.

EXAMPLE

Next, the present invention will be described more concretely with demonstrating examples. Hereinafter, unless otherwise specified, the expression of "part(s)" means that by mass.

Example 1

Using a polyethylene terephthalate film (manufactured by Toray, Industries, Inc., Lumirror) of 12 μm in thickness as a substrate sheet, and coating a coating liquid for exfoliate layer having the following composition onto one side of the substrate sheet so as to obtain a coating amount of 1.0 g/m² in a dried state, and then drying, thereby, an exfoliate layer was formed. Then, a blend of a coating liquid for protective layer 1 having the following composition and a coating liquid for protective layer 2 having the following composition was prepared by mixing these coating liquid with content rates of individual binder resins as shown in Table 1, and the prepared blend was coated onto the exfoliate layer so as to obtain a coating amount of 4.5 g/m² in the dried state, and then drying, thereby, a protective layer was formed. Next, coating a coating liquid for receiving layer 1 having the following composition onto thus formed protective layer so as to obtain a film thickness of 2.0 g/m² in dried state, and then drying, thereby, a receiving layer was formed. Ultimately, the intermediate transfer medium of Example 1 was prepared. Herein, all the coatings of the coating liquid for exfoliate layer, the coating liquid for protective layer, and the coating liquid for receiving layer were performed in accordance with gravure coating. Incidentally, as a result of adding a product which was calculated by multiplying the number average molecular weight (Mn 1) of the binder resin of the coating liquid for the protective layer 1 and its content ratio (r1), i.e., 23000×0.65; and another product which was calculated by multiplying the number average molecular weight (Mn 2) of the binder resin of the coating liquid for the protective layer 2, and its content ratio (r2), i.e., 3000×0.35; the sum total (Σ) was calculated as 16000. Thus, the sum total (Σ) for the binder resins in the blend of the coating liquid for protective layer 1 and the coating liquid for protective layer 2 according to Example 1 was within the range of not less than 3000 and not more than 17000.

<Coating Liquid for Exfoliate Layer>

| | |
|---|---|
| acrylic resin (BR-87, manufactured by Mitsubishi Rayon Co., Ltd.) | 95 parts |
| polyester resin (Vylon 200, manufactured by TOYOBO Co., Ltd.) | 20 parts |
| toluene | 200 parts |
| MEK | 200 parts |

<Coating liquid for Protective Layer 1>

| | |
|---|---|
| polyester resin (Vylon 270, manufactured by TOYOBO Co., Ltd., number average molecular weight: 23000, Tg: 67° C.)) | 20 parts |
| toluene | 40 parts |
| MEK | 40 parts |

<Coating Liquid for Protective Layer 2>

| | |
|---|---|
| polyester resin (Vylon 220, manufactured by TOYOBO Co., Ltd., number average molecular weight: 3000, Tg: 53° C.)) | 20 parts |
| toluene | 40 parts |
| MEK | 40 parts |

<Coating Liquid for Receiving Layer>

| | |
|---|---|
| vinyl chloride - vinyl acetate copolymer (CNL, manufactured by Nissin Chemical Industry Co., Ltd.) | 95 parts |
| epoxy modified silicone oil (KP-1800U, manufactured by Shin-Etsu Chemical Co., Ltd.) | 5 parts |
| toluene | 200 parts |
| MEK | 200 parts |

Example 2

The same procedure as described in Example 1 was repeated, except for changing the content rates of the coating liquid for protective layer 1 and the coating liquid for protective layer 2 to the values shown in Table 1 in order to prepare an intermediate transfer medium of Example 2. Incidentally, as a result of adding a product which was calculated by multiplying the number average molecular weight (Mn 1) of the binder resin of the coating liquid for the protective layer 1 and its content ratio (r1), i.e., 23000×0.50; and another product which was calculated by multiplying the number average molecular weight (Mn 2) of the binder resin of the coating liquid for the protective layer 2, and its content ratio (r2), i.e., 3000×0.50; the sum total (Σ) was calculated as 13000. Thus, the sum total (Σ) for the binder resins in the blend of the coating liquid for protective layer 1 and the coating liquid for protective layer 2 according to Example 2 was within the range of not less than 3000 and not more than 17000.

Example 3

The same procedure as described in Example 1 was repeated, except for changing the content rates of the coating liquid for protective layer 1 and the coating liquid for protective layer 2 to the values shown in Table 1 in order to prepare an intermediate transfer medium of Example 3. Incidentally, as a result of adding a product which was calculated by multiplying the number average molecular weight (Mn 1) of the binder resin of the coating liquid for the protective layer 1 and its content ratio (r1), i.e., 23000×0.35; and another product which was calculated by multiplying the number average molecular weight (Mn 2) of the binder resin of the coating liquid for the protective layer 2, and its content ratio (r2), i.e., 3000×0.65; the sum total (Σ) was calculated as 10000. Thus, the sum total (Σ) for the binder resins in the blend of the coating liquid for protective layer 1 and the coating liquid for protective layer 2 according to Example 3 was within the range of not less than 3000 and not more than 17000.

Example 4

The same procedure as described in Example 1 was repeated, except for using the coating liquid for protective layer 1 and a coating liquid for protective layer 3 with their content rates shown in Table 1 in order to prepare an intermediate transfer medium of Example 4. Incidentally, as a result of adding a product which was calculated by multiplying the number average molecular weight (Mn 1) of the binder resin of the coating liquid for the protective layer 1 and its content ratio (r1), i.e., 23000×0.35; and another product which was calculated by multiplying the number average molecular weight (Mn 3) of the binder resin of the coating liquid for the protective layer 3, and its content ratio (r3), i.e., 10000×0.65; the sum total (Σ) was calculated as 14550. Thus, the sum total (Σ) for the binder resins in the blend of the coating liquid for protective layer 1 and the coating liquid for protective layer 3 according to Example 4 was within the range of not less than 3000 and not more than 17000.

<Coating Liquid for Protective Layer 3>

| | |
|---|---|
| polyester resin (Vylon GK-250, manufactured by TOYOBO Co., Ltd., number average molecular weight: 10000, Tg: 60° C.)) | 20 parts |
| toluene | 40 parts |
| MEK | 40 parts |

Example 5

The same procedure as described in Example 1 was repeated, except for using the coating liquid for protective layer 2 and a coating liquid for protective layer 4 having the following composition with their content rates shown in Table 1 in order to prepare an intermediate transfer medium of Example 5. Incidentally, as a result of adding a product which was calculated by multiplying the number average molecular weight (Mn 2) of the binder resin of the coating liquid for the protective layer 2 and its content ratio (r2), i.e., 3000×0.20; and another product which was calculated by multiplying the number average molecular weight (Mn 4) of the binder resin of the coating liquid for the protective layer 4, and its content ratio (r4), i.e., 17000×0.80; the sum total (Σ) was calculated as 14200. Thus, the sum total (Σ) for the binder resins in the blend of the coating liquid for protective layer 2 and the coating liquid for protective layer 4 according to Example 5 was within the range of not less than 3000 and not more than 17000.

<Coating Liquid for Protective Layer 4>

| | |
|---|---|
| polyester resin (Vylon 200, manufactured by TOYOBO Co., Ltd., number average molecular weight: 17000, Tg: 67° C.)) | 20 parts |
| toluene | 40 parts |
| MEK | 40 parts |

Example 6

The same procedure as described in Example 1 was repeated, except for using the coating liquid for protective layer 2 and the coating liquid for protective layer 4 with their content rates shown in Table 1 in order to prepare an intermediate transfer medium of Example 6. Incidentally, as a result of adding a product which was calculated by multiplying the number average molecular weight (Mn 2) of the binder resin of the coating liquid for the protective layer 2 and its content ratio (r2), i.e., 3000×0.80; and another product which was calculated by multiplying the number average molecular weight (Mn 4) of the binder resin of the coating liquid for the protective layer 4, and its content ratio (r4), i.e., 17000×0.20; the sum total (Σ) was calculated as 5800. Thus, the sum total (Σ) for the binder resins in the blend of the coating liquid for protective layer 2 and the coating liquid for protective layer 4 according to Example 6 was within the range of not less than 3000 and not more than 17000.

Example 7

The same procedure as described in Example 1 was repeated, except for using the coating liquid for protective layer 3 and the coating liquid for protective layer 4 with their content rates shown in Table 1 in order to prepare an intermediate transfer medium of Example 7. Incidentally, as a result of adding a product which was calculated by multiplying the number average molecular weight (Mn 3) of the binder resin of the coating liquid for the protective layer 3 and its content ratio (r3), i.e., 10000×0.30; and another product which was calculated by multiplying the number average molecular weight (Mn 4) of the binder resin of the coating liquid for the protective layer 4, and its content ratio (r4), i.e., 17000×0.70; the sum total (Σ) was calculated as 14900. Thus, the sum total (Σ) for the binder resins in the blend of the coating liquid for protective layer 3 and the coating liquid for protective layer 4 according to Example 7 was within the range of not less than 3000 and not more than 17000.

Example 8

The same procedure as described in Example 1 was repeated, except for using the coating liquid for protective layer 3 and the coating liquid for protective layer 4 with their content rates shown in Table 1 in order to prepare an intermediate transfer medium of Example 8. Incidentally, as a result of adding a product which was calculated by multiplying the number average molecular weight (Mn 3) of the binder resin of the coating liquid for the protective layer 3 and its content ratio (r3), i.e., 10000×0.50; and another product which was calculated by multiplying the number average molecular weight (Mn 4) of the binder resin of the coating liquid for the protective layer 4, and its content ratio (r4), i.e., 17000×0.50; the sum total (Σ) was calculated as 13500. Thus, the sum total (Σ) for the binder resins in the blend of the coating liquid for protective layer 3 and the coating liquid for protective layer 4 according to Example 8 was within the range of not less than 3000 and not more than 17000.

Example 9

The same procedure as described in Example 1 was repeated, except for using the coating liquid for protective layer 3 and the coating liquid for protective layer 4 with their content rates shown in Table 1 in order to prepare an intermediate transfer medium of Example 9. Incidentally, as a result of adding a product which was calculated by multiplying the number average molecular weight (Mn 3) of the binder resin of the coating liquid for the protective layer 3 and its content ratio (r3), i.e., 10000×0.70; and another product which was calculated by multiplying the number average molecular weight (Mn 4) of the binder resin of the coating liquid for the protective layer 4, and its content ratio (r4), i.e., 17000×0.30; the sum total (Σ) was calculated as 12100. Thus, the sum total (Σ) for the binder resins in the blend of the coating liquid for protective layer 3 and the coating liquid for protective layer 4 according to Example 9 was within the range of not less than 3000 and not more than 17000.

Example 10

The same procedure as described in Example 1 was repeated, except for using the coating liquid for protective layer 3 and the coating liquid for protective layer 4 with their content rates shown in Table 1 in order to prepare an intermediate transfer medium of Example 10. Incidentally, as a result of adding a product which was calculated by multiplying the number average molecular weight (Mn 3) of the binder resin of the coating liquid for the protective layer 3 and its content ratio (r3), i.e., 10000×0.65; and another product which was calculated by multiplying the number average molecular weight (Mn 4) of the binder resin of the coating liquid for the protective layer 4, and its content ratio (r4), i.e., 17000×0.35; the sum total (Σ) was calculated as 12450. Thus, the sum total (Σ) for the binder resins in the blend of the coating liquid for protective layer 3 and the coating liquid for protective layer 4 according to Example 10 was within the range of not less than 3000 and not more than 17000.

Example 11

The same procedure as described in Example 1 was repeated, except for using the coating liquid for protective layer 3 and a coating liquid for protective layer 5 having the following composition with their content rates shown in Table 1 in order to prepare an intermediate transfer medium of Example 11. Incidentally, as a result of adding a product which was calculated by multiplying the number average molecular weight (Mn 3) of the binder resin of the coating liquid for the protective layer 3 and its content ratio (r3), i.e., 10000×0.5; and another product which was calculated by multiplying the number average molecular weight (Mn 5) of the binder resin of the coating liquid for the protective layer 5, and its content ratio (r5), i.e., 16000×0.5; the sum total (Σ) was calculated as 13000. Thus, the sum total (Σ) for the binder resins in the blend of the coating liquid for protective layer 3 and the coating liquid for protective layer 5 according to Example 11 was within the range of not less than 3000 and not more than 17000.

<Coating Liquid for Protective Layer 5>

| | |
|---|---|
| polyester resin (Vylon 600, manufactured by TOYOBO Co., Ltd., number average molecular weight: 16000, Tg: 47° C.)) | 20 parts |
| toluene | 40 parts |
| MEK | 40 parts |

Example 12

The same procedure as described in Example 1 was repeated, except for using the coating liquid for protective layer 2, the coating liquid for protective layer 3 and the coating liquid for protective layer 4 with their content rates shown in Table 1 in order to prepare an intermediate transfer medium of Example 12. Incidentally, as a result of adding a product which was calculated by multiplying the number average molecular weight (Mn 2) of the binder resin of the coating liquid for the protective layer 3 and its content ratio (r2), i.e., 3000×0.1; another product which was calculated by multiplying the number average molecular weight (Mn 3) of the binder resin of the coating liquid for the protective layer 3 and its content ratio (r3), i.e., 10000×0.3; and further another product which was calculated by multiplying the number average molecular weight (Mn 4) of the binder resin of the coating liquid for the protective layer 4, and its content ratio (r4), i.e., 17000×0.5; the sum total (Σ) was calculated as 12800. Thus, the sum total (Σ) for the binder resins in the blend of the coating liquid for protective layer 2, the coating liquid for protective layer 3 and the coating liquid for protective layer 4 according to Example 12 was within the range of not less than 3000 and not more than 17000.

Example 13

The same procedure as described in Example 1 was repeated, except for using the coating liquid for protective layer 2, the coating liquid for protective layer 3 and the coating liquid for protective layer 4 with their content rates shown in Table 1 in order to prepare an intermediate transfer medium of Example 13. Incidentally, as a result of adding a product which was calculated by multiplying the number average molecular weight (Mn 2) of the binder resin of the coating liquid for the protective layer 3 and its content ratio (r2), i.e., 3000×0.25; another product which was calculated by multiplying the number average molecular weight (Mn 3) of the binder resin of the coating liquid for the protective layer 3 and its content ratio (r3), i.e., 10000×0.25; and further another product which was calculated by multiplying the number average molecular weight (Mn 4) of the binder resin of the coating liquid for the protective layer 4, and its content ratio (r4), i.e., 17000×0.5; the sum total (Σ) was calculated as 11750. Thus, the sum total (Σ) for the binder resins in the blend of the coating liquid for protective layer 2, the coating liquid for protective layer 3 and the coating liquid for protective layer 4 according to Example 13 was within the range of not less than 3000 and not more than 17000.

Example 14

The same procedure as described in Example 1 was repeated, except for using the coating liquid for protective layer 2, the coating liquid for protective layer 3 and the coating liquid for protective layer 4 with their content rates shown in Table 1 in order to prepare an intermediate transfer medium of Example 14. Incidentally, as a result of adding a product which was calculated by multiplying the number average molecular weight (Mn 2) of the binder resin of the coating liquid for the protective layer 3 and its content ratio (r2), i.e., 3000×0.25; another product which was calculated by multiplying the number average molecular weight (Mn 3) of the binder resin of the coating liquid for the protective layer 3 and its content ratio (r3), i.e., 10000×0.375; and further another product which was calculated by multiplying the number average molecular weight (Mn 4) of the binder resin of the coating liquid for the protective layer 4, and its content ratio (r4), i.e., 17000×0.375; the sum total ($\Sigma$) was calculated as 10875. Thus, the sum total ($\Sigma$) for the binder resins in the blend of the coating liquid for protective layer 2, the coating liquid for protective layer 3 and the coating liquid for protective layer 4 according to Example 14 was within the range of not less than 3000 and not more than 17000.

Comparative Example 1

The same procedure as described in Example 1 was repeated, except for using a coating liquid for protective layer which included only the coating liquid for protective layer 1 in order to prepare an intermediate transfer medium of Comparative Example 1. Incidentally, the sum total ($\Sigma$) which was calculated by multiplying the number average molecular weight (Mn 1) of the binder resin of the coating liquid for the protective layer 1 and its content ratio (r1), i.e., 23000×1.00, was 23000. Thus, the sum total ($\Sigma$) exceeded 17000.

Comparative Example 2

The same procedure as described in Example 1 was repeated, except for using a coating liquid for protective layer which included only the coating liquid for protective layer 2 in order to prepare an intermediate transfer medium of Comparative Example 2. Incidentally, the sum total ($\Sigma$) which was calculated by multiplying the number average molecular weight (Mn 2) of the binder resin of the coating liquid for the protective layer 2 and its content ratio (r2), i.e., 3000×1.00, was 3000.

Comparative Example 3

The same procedure as described in Example 1 was repeated, except for using a coating liquid for protective layer which included only the coating liquid for protective layer 4 in order to prepare an intermediate transfer medium of Comparative Example 3. Incidentally, the sum total ($\Sigma$) which was calculated by multiplying the number average molecular weight (Mn 4) of the binder resin of the coating liquid for the protective layer 2 and its content ratio (r4), i.e., 17000×1.00, was 17000.

Comparative Example 4

The same procedure as described in Example 1 was repeated, except for changing the content rates of the coating liquid for protective layer 1 and the coating liquid for protective layer 2 to 0.90:0.10 as shown in Table 1 in order to prepare an intermediate transfer medium of Comparative Example 4. Incidentally, as a result of adding a product which was calculated by multiplying the number average molecular weight (Mn 1) of the binder resin of the coating liquid for the protective layer 1 and its content ratio (r1), i.e., 23000×0.90; and another product which was calculated by multiplying the number average molecular weight (Mn 2) of the binder resin of the coating liquid for the protective layer 2, and its content ratio (r2), i.e., 3000×0.10; the sum total ($\Sigma$) was calculated as 21000. Thus, the sum total ($\Sigma$) for the binder resins in the blend of the coating liquid for protective layer 1 and the coating liquid for protective layer 2 according to Comparative Example 4 exceeded 17000.

Comparative Example 5

The same procedure as described in Example 1 was repeated, except for using the coating liquid for protective layer 1 and a coating liquid for protective layer 3 with their content rates of 0.70:0.30 as shown in Table 1 in order to prepare an intermediate transfer medium of Comparative Example 5. Incidentally, as a result of adding a product which was calculated by multiplying the number average molecular weight (Mn 1) of the binder resin of the coating liquid for the protective layer 1 and its content ratio (r1), i.e., 23000×0.70; and another product which was calculated by multiplying the number average molecular weight (Mn 3) of the binder resin of the coating liquid for the protective layer 3, and its content ratio (r3), i.e., 10000×0.30; the sum total ($\Sigma$) was calculated as 19100. Thus, the sum total ($\Sigma$) for the binder resins in the blend of the coating liquid for protective layer 1 and the coating liquid for protective layer 3 according to Comparative Example 5 exceeded 17000.

(Preparation of Thermal Transfer Sheet)

As a substrate sheet, polyethylene terephthalate film which had 4.5 μm in thickness was used. On the same surface of this substrate sheet, dye layers of yellow (Y), magenta (M) and cyan (C), and peel-off layer were are repeatedly formed as shown in FIG. 3 so as to be layered in parallel on the substrate across the surface of the substrate, as being frame sequentially, by using a coating liquid for yellow dye layer having the following composition, a coating liquid for magenta dye layer having the following composition, a coating liquid for forming cyan dye layer having the following composition, and a coating liquid for peel-off layer 1. Then, on another surface of the substrate sheet, a coating liquid for back face layer having the following composition was coated so as to obtain a thickness of 0.8 g/m$^2$ in the dried state and then the coated liquid was dried to form a heat resistant active layer. Ultimately, a thermal transfer sheet was prepared. Here, coating amounts of the coating liquid for yellow dye layer, the coating liquid for magenta dye layer, the coating liquid for forming cyan dye layer, and the coating liquid for peel-off layer were each individually 0.6 g/m$^2$ in the dried state.

<Coating Liquid for Yellow Dye Layer>

| | |
|---|---|
| Dye represented by the following formula | 4.0 parts |
| polyvinyl acetal resin | 3.5 parts |
| (S-LEC KS-5, manufactured by Sekisui Chemical Co., Ltd.) | |
| Polyethylene wax | 0.1 part |

| | |
|---|---|
| Methyl ethyl ketone | 45.0 parts |
| Toluene | 45.0 parts |

[Chem. 1]

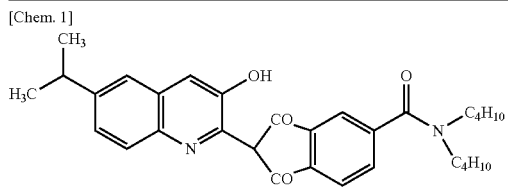

<Coating Liquid for Magenta Dye Layer>

| | |
|---|---|
| Disperse dye (Disperse Red 60) | 1.5 parts |
| Disperse dye (Disperse Violet 26) | 2.0 parts |
| polyvinyl acetal resin (S-LEC KS-5, manufactured by Sekisui Chemical Co., Ltd.) | 4.5 parts |
| Polyethylene wax | 0.1 part |
| Methyl ethyl ketone | 45.0 parts |
| Toluene | 45.0 parts |

<Coating Liquid for Cyan Dye Layer>

| | |
|---|---|
| Disperse dye (Solvent Blue 63) | 4.0 parts |
| polyvinyl acetal resin (S-LEC KS-5, manufactured by Sekisui Chemical Co., Ltd.) | 3.5 parts |
| Polyethylene wax | 0.1 part |
| Methyl ethyl ketone | 45.0 parts |
| Toluene | 45.0 parts |

(Coating Liquid for Peel-Off Layer 1)

| | |
|---|---|
| Acrylic resin (BR-87, manufactured by Mitsubishi Rayon Co., Ltd.) | 5 parts |
| Methyl ethyl ketone | 47.5 parts |
| Toluene | 47.5 parts |

<Coating Solution for Back Face Layer>

| | |
|---|---|
| Polyvinyl butyral resin (S-LEC BX-1, manufactured by Sekisui Chemical Co., Ltd.) | 2.0 parts |
| Polyisocyanate (BURNOCK D750, manufactured by DIC Corporation) | 9.2 parts |
| Phosphoric ester type surfactant (PLY SURF A208N, manufactured by Dai-ichi Kogyo Seiyaku, Co., Ltd.) | 1.3 parts |
| Talc (MICRO ACE P-3, manufactured by Nippon Talc Co., Ltd.) | 0.3 parts |
| toluene | 43.6 parts |
| methyl ethyl ketone | 43.6 parts |

(Print)

Using HDP-600 printer (manufactured by HID) which was equipped with a commercially available thermal head, and thermal transfer sheet prepared by the above mentioned procedure, a sublimation transferred photo-scales' image was formed onto each individual receiving layer of the intermediate transfer media of Examples 1-14 and Comparative Examples 1-5. Then, each receiving layer of the intermediate transfer media of Examples and Comparative examples, which had thus formed thermal transferred image, was superposed on the peel-off layer of the thermal transfer sheet prepared as above so as to come into contact with each other, and the assemble was heated from the back side of the thermal transfer sheet by using the same printer. Thereby, at the pre-determined regions (a region corresponding to the outside of edges of a card (See, symbol "A" in FIG. 7) and a region corresponding to a region allocated for an IC chip (See, symbol "B" in FIG. 7), the transfer layer which was comprised of the exfoliate layer/the protective layer/the receiving layer was removed from the intermediate transfer medium. Then, using a heat roll, each transfer layer the predetermined regions of which were removed was re-transferred onto the card made of polyvinyl chloride as the transfer receiving article, in order to obtain the prints of Examples 1-14 and Comparative Examples 1-5. With respect to each and every Example, it was confirmed that the transfer layer can be re-transferred onto the card made of polyvinyl chloride as the transfer receiving article without any problem.

<Durability (Taber Test)>

The prints of Examples 1-14 and Comparative Examples 1-5 which were obtained as mentioned above underwent wearing by using a Taber abrasion tester wherein a wear ring CS-10F was used under a load of 500 gf and was run for 750 revolutions in total while the wear ring was grinded per 250 revolutions. After wearing, the conditions of the surfaces were observed by visually, and evaluation of this test was done under the following evaluation criteria. The evaluation test results are shown in table 1.

<Evaluation Criteria>

4 . . . The image was not removed at all.
3 . . . The image was little removed.
2 . . . The image was removed to a certain degree, but there is no problem to use.
1 . . . The image was fairly removed.

<Peel-Off Property (Tailing) Test>

Figure 7:
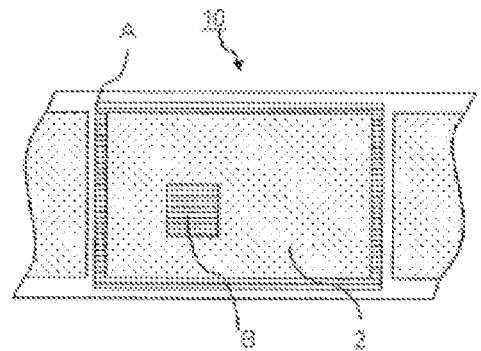
FIG. 7 is an explanatory view showing the measuring position for tailing length.

The prints of Examples 1-14 and Comparative Examples 1-5 which were obtained as mentioned above underwent visual observation about the peel-off property, and evaluation of this test was done under the following evaluation criteria. The evaluation test results are also shown in table 1. Incidentally, the tailing amount in the following evaluation criteria means the length of the transfer layer which had intended to remain essentially on the intermediate transfer medium side, that is, which had been corresponding to the non-transferred region, but which was unexpectedly removed together with the transferred regions (transferred regions corresponding to symbols "A" and "B" in FIG. 7). Thus, as the length of the removed transfer layer of the non-transferred region becomes shorter, that is, as the tailing amount becomes shorter, the demonstrated is a good peel-off property. When evaluating the peel-off property, as shown in FIG. 7, the tailing amount was measured at the region A (the peripheral edges of transferred image) and the region B (the region allocated for an IC chip) where the tailing would be easy to occur.

<Evaluation Criteria for Region A (Peripheral Edges of Transferred Image)>

4 . . . Tailing amount is less than 0.5 mm.
3 . . . Tailing amount is not less than 0.5 mm and less than 1 mm.
2 . . . Tailing amount is not less than 1 mm and less than 2 mm, but, practically, it is not at a level that becomes a problem.
1 . . . Trailing amount is not less than 2 mm, and it is the level that a certain problem arises practically.

<Evaluation Criteria for Region B (Region Allocated for IC Chip)>

4 . . . Tailing amount is less than 0.1 mm.
3 . . . Tailing amount is not less than 0.1 mm and less than 0.3 mm.
2 . . . Tailing amount is not less than 0.3 mm and less than 1 mm, but, practically, it is not at a level that becomes a problem.

1 ... Trailing amount is not less than 1 mm, and it is the level that a certain problem arises practically.

TABLE 1

| | Content ratio (r) of binder resins of protective layer | Value of Σ (Wi × ri) | Durability | Peel-off property Region A | Peel-off property Region B |
|---|---|---|---|---|---|
| Example 1 | Coating liquid 1:Coating liquid 2 = 0.65:0.3 | 16,000 | 4 | 3 | 2 |
| Example 2 | Coating liquid 1:Coating liquid 2 = 0.5:0.5 | 13,000 | 3 | — | 3 |
| Example 3 | Coating liquid 1:Coating liquid 2 = 0.35:0.65 | 10,000 | 2 | — | 4 |
| Example 4 | Coating liquid 1:Coating liquid 3 = 0.35:0.65 | 14,550 | 4 | 4 | 2 |
| Example 5 | Coating liquid 2:Coating liquid 4 = 0.2:0.8 | 14,200 | 4 | 4 | 2 |
| Example 6 | Coating liquid 2:Coating liquid 4 = 0.8:0.2 | 5,800 | 2 | — | 4 |
| Example 7 | Coating liquid 3:Coating liquid 4 = 0.3:0.7 | 14,900 | 4 | 3 | 2 |
| Example 8 | Coating liquid 3:Coating liquid 4 = 0.5:0.5 | 13,500 | 4 | — | 3 |
| Example 9 | Coating liquid 3:Coating liquid 4 = 0.7:0.3 | 12,100 | 3 | — | 3 |
| Example 10 | Coating liquid 3:Coating liquid 4 = 0.65:0.35 | 12,450 | 3 | 4 | 3 |
| Example 11 | Coating liquid 3:Coating liquid 5 = 0.5:0.5 | 13,000 | 3 | 4 | 3 |
| Example 12 | Coating liquid 2:Coating liquid 3:Coating liquid 4 = 0.1:0.4:0.5 | 12,800 | 3 | 4 | 3 |
| Example 13 | Coating liquid 2:Coating liquid 3:Coating liquid 4 = 0.25:0.25:0.5 | 11,750 | 3 | 4 | 4 |
| Example 14 | Coating liquid 2:Coating liquid 3:Coating liquid 4 = 0.25:0.375:0.375 | 10,875 | 3 | 4 | 4 |
| Comparative Example 1 | Coating liquid 1 = 1 | 23,000 | 4 | 1 | 1 |
| Comparative Example 2 | Coating liquid 2 = 1 | 3,000 | 1 | 4 | 4 |
| Comparative Example 3 | Coating liquid 4 = 1 | 17,000 | 4 | 1 | 1 |
| Comparative Example 4 | Coating liquid 1:Coating liquid 2 = 0.9:0.1 | 21,000 | 4 | 1 | 1 |
| Comparative Example 5 | Coating liquid 1:Coating liquid 3 = 0.7:0.3 | 19,100 | 4 | 1 | 1 |

As is apparent from Table 1, according to the intermediate transfer medium which was provided with the protective layer that satisfied all of the matters specifying the invention, it was possible to obtain good results in both of the peel-off property and the durability. On the other hand, according to the intermediate transfer medium which was provided with the protective layer that did not satisfy the matters specifying the invention, it is impossible to obtain good results in both of the peel-off property and the durability. From these facts, the superiority of the protective layer transfer sheet according to the present invention became evident.

Next, the combination of the intermediate transfer medium and the thermal transfer sheet according to the present invention will be described more concretely with demonstrating examples.

(Preparation of Intermediate Transfer Medium (1))

Using a polyethylene terephthalate film (manufactured by Toray, Industries, Inc., Lumirror) of 12 μm in thickness as a substrate sheet, and coating the coating liquid for exfoliate layer which was used for preparation of the intermediate transfer medium of above mentioned Example 1 onto one side of the substrate sheet so as to obtain a coating amount of 1.0 g/m² in a dried state, and then drying, thereby, an exfoliate layer was formed. Then, a coating liquid for protective layer 6 having the following composition was coated onto the exfoliate layer so as to obtain a coating amount of 4.5 g/m² in the dried state, and then drying, thereby, a protective layer was formed. Next, coating the coating liquid for receiving layer which was used for preparation of the intermediate transfer medium of above mentioned Example 1 onto thus formed protective layer so as to obtain a film thickness of 2.0 g/m² in dried state, and then drying, thereby, a receiving layer was formed. Ultimately, the intermediate transfer medium (1) was prepared. Herein, all the coatings of the coating liquid for exfoliate layer, the coating liquid for protective layer, and the coating liquid for receiving layer were performed in accordance with gravure coating.

<Coating Liquid for Protective Layer 6>

| | |
|---|---|
| polyester resin (UE-9885, manufactured by Unitika Ltd., number average molecular weight: 6000, Tg: 82° C.)) | 20 parts |
| toluene | 40 parts |
| MEK | 40 parts |

(Preparation of Intermediate Transfer Medium (2))

The same procedure as described in the preparation of intermediate transfer medium (1) was repeated, except for replacing the coating liquid for protective layer 6 with a coating liquid for protective layer 7 having the following composition, in order to prepare an intermediate transfer medium (2).

<Coating Liquid for Protective Layer 7>

| | |
|---|---|
| polyester resin (UE-3380, manufactured by Unitika Ltd., number average molecular weight: 8000, Tg: 60° C.)) | 20 parts |
| toluene | 40 parts |
| MEK | 40 parts |

(Preparation of Intermediate Transfer Medium (3))

The same procedure as described in the preparation of intermediate transfer medium (1) was repeated, except for replacing the coating liquid for protective layer 6 with a coating liquid for protective layer 8 having the following composition, in order to prepare an intermediate transfer medium (3).

<Coating Liquid for Protective Layer 8>

| | |
|---|---|
| polyester resin (GK250, manufactured by TOYOBO Co., Ltd., number average molecular weight: 10000, Tg: 60° C.)) | 20 parts |
| toluene | 40 parts |
| MEK | 40 parts |

(Preparation of Intermediate Transfer Medium (A))

The same procedure as described in the preparation of intermediate transfer medium (1) was repeated, except for replacing the coating liquid for protective layer 6 with a coating liquid for protective layer A having the following composition, in order to prepare an intermediate transfer medium (A).

<Coating Liquid for Protective Layer A>

| | |
|---|---|
| polyester resin (UE-9820, manufactured by Unitika Ltd., number average molecular weight: 2000, Tg: 52° C.)) | 20 parts |
| toluene | 40 parts |
| MEK | 40 parts |

(Preparation of Intermediate Transfer Medium (B))

The same procedure as described in the preparation of intermediate transfer medium (1) was repeated, except for replacing the coating liquid for protective layer 6 with a coating liquid for protective layer B, in order to prepare an intermediate transfer medium (B). Herein, the coating liquid for protective layer B had the same composition with the coating liquid for protective layer 5 which was used for preparation of the intermediate transfer medium of above mentioned Example 11.

(Preparation of Intermediate Transfer Medium (C))

The same procedure as described in the preparation of intermediate transfer medium (1) was repeated, except for replacing the coating liquid for protective layer 6 with a coating liquid for protective layer C, in order to prepare an intermediate transfer medium (C). Herein, the coating liquid for protective layer C had the same composition with the coating liquid for protective layer 1 which was used for preparation of the intermediate transfer medium of above mentioned Example 1.

(Preparation of Thermal Transfer Seet (1))

As a substrate sheet, polyethylene terephthalate film which underwent easy-adhesive treatment in advance, and which had 4.5 μm in thickness was used. On this substrate, the coating liquid for back face layer having above mentioned composition was coated so as to obtain a coating amount of 0.8 g/m² in a dried state and then the coated liquid was dried to form a back face layer. Then, on another surface of the substrate, the coating liquid for yellow dye layer having above mentioned composition, the coating liquid for magenta dye layer having above mentioned composition, the coating liquid for forming cyan dye layer having above mentioned composition, and the coating liquid for peel-off layer 1 having above mentioned composition were coated so as to be layered in parallel on the substrate across the surface of the substrate, as being frame sequentially, and so as to obtain each individual thickness of 0.6 g/m² in the dried state, and then the coated liquids were dried. Ultimately, a thermal transfer sheet (1) was prepared.

Preparation of Thermal Transfer Sheet (2))

The same procedure as described in the preparation of the thermal transfer sheet (1) was repeated, except for replacing the coating liquid for peel-off layer 1 with a coating liquid for peel-off layer 2 having the following composition, in order to prepare an thermal transfer sheet (2).

<Coating Liquid for Peel-Off Layer 2>

| | |
|---|---|
| Vinyl chloride - vinyl acetate copolymer resin (SOLBIN A, manufactured by Nissin Chemical Industry Co., Ltd.) | 5 parts |
| Methyl ethyl ketone | 47.5 parts |
| Toluene | 47.5 parts |

(Preparation of Thermal Transfer Sheet (3))

The same procedure as described in the preparation of the thermal transfer sheet (1) was repeated, except for replacing the coating liquid for peel-off layer 1 with a coating liquid for peel-off layer 3 having the following composition, in order to prepare an thermal transfer sheet (3).

<Coating Liquid for Peel-Off Layer 2>

| | |
|---|---|
| Polyester resin (Vylon 700, manufactured by Toyobo Co., Ltd.) | 5 parts |
| Methyl ethyl ketone | 47.5 parts |
| Toluene | 47.5 parts |

The thermal transfer sheets and the intermediate transfer mediums shown in Table 2 below were used individually as the combinations of the intermediate transfer media and the thermal transfer sheets of Examples and Comparative Examples.

Using HDP-600 printer (manufactured by HID) which was equipped with a commercially available thermal head, a sublimation transferred photo-scales' image was formed onto each individual receiving layer of the intermediate transfer media which were used in the combinations for Examples and Comparative Examples shown in Table 2. Then, each receiving layer of the intermediate transfer media which were used for the combinations of Examples and Comparative examples, and which had thus formed thermal transferred image, was superposed on the peel-off layer of the respective thermal transfer sheet to be combined with the intermediate transfer medium concerned in accordance with the combinations shown in Table 2 so as to come into contact with each other, and the assemble was heated from the back side of the thermal transfer sheet by using the same printer. Thereby, at the predetermined regions (a region corresponding to the outside of edges of a card (See, symbol "A" in FIG. 12) and a region corresponding to a region allocated for an IC chip (See, symbol "B" in FIG. 12), the transfer layer which was comprised of the exfoliate layer/the protective layer/the receiving layer was removed from the intermediate transfer medium. Then, using a heat roll, each transfer layer the predetermined regions of which were removed was re-transferred onto the card made of polyvinyl chloride as the transfer receiving article, in order to obtain the prints of Examples and Comparative Examples which were used the combination shown in Table 2.

<Durability (Taber Test)>

The prints of Examples and Comparative Examples which were obtained as mentioned above underwent wearing by using a Taber abrasion tester wherein a wear ring CS-10F was used under a load of 500 gf and was run for 500 revolutions in total while the wear ring was grinded per 250 revolutions. After wearing, the conditions of the surfaces were observed by visually, and evaluation of this test was done under the same evaluation criteria with those of above mentioned Durability (Taber Test) for Examples 1-14 and Comparative Example 1-5. The evaluation test results are shown in table 2.

<Peel-Off Property (Tailing) Test>

The prints of Examples and Comparative Examples which were obtained as mentioned above underwent visual observation about the peel-off property, and evaluation of this test was done under the same evaluation criteria with those of above mentioned Peel-off property (tailing) Test for Examples 1-14 and Comparative Example 1-5. When evaluating the peel-off property, as shown in FIG. 12, the tailing amount was measured at the region A (the peripheral edges of transferred image) and the region B (the region allocated for an IC chip) where the tailing would be easy to occur.

<Storage Stability Test>

The intermediate transfer media of individual Examples and Comparative Examples shown in Table 2 were stacked up as sheets, a load of 2 kgf/cm² were applied to the stacked sheets, and the loaded stacked sheets were left standing for 24 hours at 60° C. After this storage, the storage stability was evaluated under the following evaluation criteria. The evaluation results are shown in Table 2. Incidentally, the condition of the loaded standing as mentioned above was set to be severer than the normal storage conditions for handling. Thus it was a forced accelerated condition.

<Evaluation Criteria>

4 . . . Blocking was not observed.
3 . . . Blocking was slightly caused.
2 . . . Blocking was strongly caused.
1 . . . Blocking was strongly caused to the extent that it was impossible to separate sheets from each other.

TABLE 2

| | Combination | | | Peel-off property | | Storage stability |
|---|---|---|---|---|---|---|
| | Intermediate transfer medium | Thermal transfer sheet | Durability | A | B | |
| Example 15 | Intermediate transfer medium (1) | Thermal transfer sheet (1) | 3 | 3 | 4 | 4 |
| Example 16 | Intermediate transfer medium (2) | Thermal transfer sheet (1) | 3 | 3 | 3 | 4 |
| Example 17 | Intermediate transfer medium (3) | Thermal transfer sheet (1) | 3 | 3 | 3 | 4 |
| Example 18 | Intermediate transfer medium (1) | Thermal transfer sheet (2) | 3 | 3 | 4 | 4 |
| Example 19 | Intermediate transfer medium (1) | Thermal transfer sheet (3) | 3 | 3 | 4 | 4 |
| Comparative Example 6 | Intermediate transfer medium (A) | Thermal transfer sheet (1) | 1 | 4 | 4 | 1 |
| Comparative Example 7 | Intermediate transfer medium (B) | Thermal transfer sheet (1) | 4 | 2 | 1 | 2 |
| Comparative Example 8 | Intermediate transfer medium (C) | Thermal transfer sheet (1) | 4 | 1 | 1 | 4 |

EXPLANATION OF THE NUMERALS 1, 51 Substrate sheet (substrate
2, 50 Transfer layer
3, 53 Protective layer
4, 54 Receiving layer
5, 52 Exfoliate layer
9 Predetermined region
10, 60 Intermediate transfer medium
11, 105 Peel-off layer
12, 102 dye layer
13, 103 Fusible layer
14, 101 Substrate layer
15, 107 back face layer
16, 150 Thermal head
17 Heat roll
20, 100 Thermal transfer sheet
30 Transfer receiving article
31 Ancillary product
A Peripheral edges of transferred image
B Region allocated for an IC chip

The invention claimed is:

1. An intermediate transfer medium which comprises a substrate sheet, a protective layer and a receiving layer which are layered on a surface of the substrate sheet;
   wherein the protective layer comprises a blend of two or more kinds of binder resins which have mutually different number average molecular weights (Mn), and wherein a sum total (Σ) of products, each product being calculated by multiplying the number average molecular weight (Mn) of individual binder resin and its content ratio in the blend together, is in the range of not less than 3000 and not more than 17000.

2. The intermediate transfer medium according to claim 1, wherein at least one binder resin of two or more kinds of the binder resins is a polyester type resin.

3. The intermediate transfer medium according to claim 2, wherein two or more kinds of the binder resins include a polyester type resin A having a number average molecular weight (Mn) of not less than 2000 and not more than 10000, and a polyester type resin B having a number average molecular weight (Mn) of more than 10000 and not more than 25000.

4. The intermediate transfer medium according to claim 3, wherein two or more kinds of the binder resins include a polyester type resin A1 having a number average molecular weight (Mn) of not less than 2000 and not more than 4000, a polyester type resin A2 having a number average molecular weight (Mn) of more than 4000 and not more than 10000, and a polyester type resin B having a number average molecular weight (Mn) of more than 10000 and not more than 25000.

5. The intermediate transfer medium according claim 4, wherein the intermediate transfer medium further comprises a release layer which is provided between the protective layer and the substrate sheet.

6. The intermediate transfer medium according to claim 3, wherein the intermediate transfer medium further comprises a release layer which is provided between the protective layer and the substrate sheet.

7. The intermediate transfer medium according to claim 3, wherein the intermediate transfer medium further comprises a release layer which is provided between the protective layer and the substrate sheet.

8. The intermediate transfer medium according to claim 2, wherein two or more kinds of the binder resins include a polyester type resin A1 having a number average molecular weight (Mn) of not less than 2000 and not more than 4000, a polyester type resin A2 having a number average molecular weight (Mn) of more than 4000 and not more than 10000, and a polyester type resin B having a number average molecular weight (Mn) of more than 10000 and not more than 25000.

9. The intermediate transfer medium according to claim 8, wherein the intermediate transfer medium further comprises a release layer which is provided between the protective layer and the substrate sheet.

10. The intermediate transfer medium according claim 2, wherein the intermediate transfer medium further comprises a release layer which is provided between the protective layer and the substrate sheet.

11. The intermediate transfer medium according to claim 2, wherein two or more kinds of the binder resins include a polyester type resin A having a number average molecular weight (Mn) of not less than 2000 and not more than 10000, and a polyester type resin B having a number average molecular weight (Mn) of more than 10000 and not more than 25000.

12. The intermediate transfer medium according to claim 2, wherein two or more kinds of the binder resins include a polyester type resin A1 having a number average molecular weight (Mn) of not less than 2000 and not more than 4000, a polyester type resin A2 having a number average molecular weight (Mn) of more than 4000 and not more than 10000, and a polyester type resin B having a number average molecular weight (Mn) of more than 10000 and not more than 25000.

13. The intermediate transfer medium according claim 2, wherein the intermediate transfer medium further comprises a release layer which is provided between the protective layer and the substrate sheet.

14. The intermediate transfer medium according to claim 1, wherein two or more kinds of the binder resins include a polyester type resin A having a number average molecular weight (Mn) of not less than 2000 and not more than 10000, and a polyester type resin B having a number average molecular weight (Mn) of more than 10000 and not more than 25000.

15. The intermediate transfer medium according to claim 14, wherein two or more kinds of the binder resins include a polyester type resin A1 having a number average molecular weight (Mn) of not less than 2000 and not more than 4000, a polyester type resin A2 having a number average molecular weight (Mn) of more than 4000 and not more than 10000, and a polyester type resin B having a number average molecular weight (Mn) of more than 10000 and not more than 25000.

16. The intermediate transfer medium according claim 14, wherein the intermediate transfer medium further comprises a release layer which is provided between the protective layer and the substrate sheet.

17. The intermediate transfer medium according to claim 1, wherein two or more kinds of the binder resins include a polyester type resin A1 having a number average molecular weight (Mn) of not less than 2000 and not more than 4000, a polyester type resin A2 having a number average molecular weight (Mn) of more than 4000 and not more than 10000, and a polyester type resin B having a number average molecular weight (Mn) of more than 10000 and not more than 25000.

18. The intermediate transfer medium according claim 17, wherein the intermediate transfer medium further comprises a release layer which is provided between the protective layer and the substrate sheet.

19. The intermediate transfer medium according claim 1, wherein the intermediate transfer medium further comprises a release layer which is provided between the protective layer and the substrate sheet.

20. A combination of an intermediate transfer medium and a thermal transfer sheet,
wherein the intermediate transfer medium comprises a substrate, a protective layer and a receiving layer which are layered in this order on a surface of the substrate sheet,
wherein the protective layer comprises a polyester type resin having a number average molecular weight (Mn) of not less than 5000 and not more than 15000, and
wherein the thermal transfer sheet comprises another substrate, and a peel-off layer which is provided on a surface of the another substrate,
wherein the peel-off layer includes one or more kinds of resins selected from the group consisting of acrylic resins, vinyl chloride-vinyl acetate copolymer resins and polyester resins.

\* \* \* \* \*